United States Patent

Lamproye et al.

[19]

[11] Patent Number: 6,075,236
[45] Date of Patent: Jun. 13, 2000

[54] REGISTRATION APPARATUS AND METHOD FOR IMAGING AT VARIABLE RESOLUTIONS

[75] Inventors: Rudi H. Lamproye; Patrick Pandelaers, both of Andover, Mass.

[73] Assignee: Agfa Corporation, Wilmington, Mass.

[21] Appl. No.: 09/033,449

[22] Filed: Mar. 2, 1998

[51] Int. Cl.[7] .................................................. H04N 5/335
[52] U.S. Cl. ........................................ 250/208.1; 348/312
[58] Field of Search ........................ 250/208.1; 348/207, 348/220, 294, 311, 314–317, 322, 323, 297

[56] References Cited

U.S. PATENT DOCUMENTS

| | | | |
|---|---|---|---|
| 4,278,995 | 7/1981 | Fearnside et al. | |
| 4,641,185 | 2/1987 | Alston et al. | 358/75 |
| 5,440,343 | 8/1995 | Parulski et al. | 348/316 |
| 5,828,407 | 10/1998 | Suzuki | 348/312 |

*Primary Examiner*—Stephone B. Allen
*Attorney, Agent, or Firm*—Michael Hanna; Edward L. Kelley

[57] ABSTRACT

An imaging system and method for registering a plurality of fractionally shifted integrated scenes of an image for an imaging system using an optical system and a sensing system, said sensing system including an integer number of photosensor arrays, such as, a CCD sensor array, wherein said integer is a number N greater than or equal to 2, said photosensor arrays having optical line spacings OLS(K+1:K) in reference to a leading photosensor array K and with respect to a lagging photosensor array K+1, for K equal to an integer from 1 to N−1, and wherein each of said plurality of N photosensor arrays further includes corresponding N transfer gate receiving means, so that, each of said N photosensor arrays is capable of being independently triggered to convert optical signals into electrical signals in response to a corresponding one of a plurality of transfer gate signals, $TG_i(t)$, where i is an integer from 1 to N, and wherein each one of said transfer gate signals has a periodicity T and angular frequency $\omega$, said transfer gate signals being of the general form $TG_i(t)=Tg_i(\omega(t-\tau_i))$. In one important embodiment of the present invention, the periodic transfer gate signals are shifted in time by a delay equal to the product of the fractional lineskip and period of the transfer gate signal. The fractional lineskip is the fractional component of the optical line spacing between a leading photosensor array and a lagging photosensor array divided by the scanned pixel size.

37 Claims, 20 Drawing Sheets

TO A/D CONVERTER AND OUTPUT PROCESSING $\tau$ = FRAC LINE SKIP (GREEN-BLUE) X T $\tau$ = FRAC LINE SKIP (RED-GREEN) X T $\sigma$ = FRAC LINE SKIP (RED-BLUE) X T T < 2$\tau$ < 2T

REGISTRATION APPARATUS AND METHOD FOR IMAGING AT VARIABLE RESOLUTIONS

FIELD OF INVENTION

The field of the present invention relates to high resolution color and monochromatic imaging systems including digital imaging systems, which employ a Charged Coupled Device, (CCD). In particular, the field of the present invention relates to optical scanning systems and the optical scanning of high-resolution images including color and monochromatic images. More particularly still, the field of the present invention relates to high resolution scanners, color and monochromatic scanners, color digital cameras, facsimile machines, color and monochromatic photocopiers, imaging systems and methods, and the like.

DEFINITIONS, ASSUMPTIONS AND STATEMENTS

The original document is the actual graphic image content of the original document to be scanned. Typically, original documents scanned by scanning systems include text, line art, color or monochrome photographs, artwork and pages comprised of both text and graphics. In the field of digital imaging, e.g., digital cameras, the original document is the original image which may also be referred to as the original scene.

Sensing system, the sensing system of the scanner, color digital or imaging system for scanning or imaging a plurality of lines from an original, comprising a plurality of photosensors for generating voltages proportional to an amount of exposed light thereon.

Charged Coupled Device, (CCD), or the like, is the opto-electronic element in the sensing system of the scanner, color digital or imaging system, which generates voltages proportional to the amount of light exposed to it. In general, a CCD comprises a plurality of photosensor arrays for scanning or imaging a plurality of lines from an original which generate voltages proportional to an amount of light exposed thereon.

The x-axis is the coordinates (abscissas) along the longitudinal axis of the CCD (also referred to as the fast scan direction).

The y-axis is the coordinates (ordinates) along the scanning axis, i.e. in the "moving direction," e.g. the transverse axis of the CCD (also referred to as the scanning axis or slow scan direction).

Scan line is the line scanned in the x-direction.

Linetime, T, also known as the integration time, is the time it takes to scan or image a line from an original; the unit of time it takes to start to scan a line beginning on line N at $t_{N-1}$ until the time it takes to begin a scan of the next line, line N+1. The start of the integration time at $t_{N-1}$ determines the start of the integration of light for a pixel in the moving direction (y-axis). The end of the integration time or the start of the next line at $t_N$ determines the end of the integration of light for that particular pixel. It is assumed that the linetime is substantially equal to the time between two consecutive transfer gate pulses, i.e. the period of the transfer gate pulse signal, T.

In general $t_N = N \times T$ and $t_N - t_{N-1} = T$ where $t_{N-1}$ is the beginning of integration of light for line N, $t_N$ is the end of integration of light for line N, T equals the linetime or period of the transfer gate signal.

Pixel, in general, is the smallest amount of information for any given scan or image.

The resolution of a scan or image refers to the granularity of the information contained in the scan or image, i.e. how many pixels are sampled per unit of distance.

The resolution in the x-dimension is defined by the CCD pitch itself.

It is assumed, as is true for most cases, that the linetime or integration time of a CCD in a scanning or imaging application is constant, and is determined by the amount of available light. This means that the actual resolution of a scan in the y-direction is determined by the speed of the scan. The resolution in the x-direction cannot be changed without changing the optics or through digital video post-processing operations.

The optical resolution, also referred to as the base resolution, is the y-resolution which corresponds to the intrinsic resolution (x-resolution) of the CCD necessary to achieve a square pixel. The optical resolution also corresponds to a certain speed, the Optical Scan Speed. The highest resolution obtainable in the y-direction corresponds to the slowest CCD movement.

OPL is the optical pixel length, which is the length of a pixel at the optical resolution, typically, given in micrometers, ($\mu$m).

The resolution of a scan, or y-resolution for a scan, is generally represented by the following formulas:

$$\text{Resolution [dpi]} = \frac{25.4 \ [\text{mm/in}]}{(\text{speed [mm/sec]})(\text{linetime [sec]})}$$

$$\text{Resolution [ppmm]} = \frac{1}{(\text{speed [mm/sec]})(\text{linetime [sec]})}$$

(Where "dpi" is dots per inch, "mm" is millimeters, "ppmm" is pixels per millimeter, "in" is inches, and, "sec" is seconds.)

It is assumed that the optical imaging system employs a magnification ratio of one.

Scanned Pixel Size, typically, refers to the Sampled Pixel Size for resolutions other than the optical resolution. Assuming a constant linetime, the scanned pixel size may be computed in units of optical pixel lengths by dividing the optical resolution by the scanning resolution. For example, if a scanning system has an optical resolution of 4,000 dpi for which the square pixel size is 7×7 $\mu$m then for a 1,600 dpi scan, the scanned or sampled pixel size is 2.5×2.5 optical pixel lengths, or 17.5×17.5 $\mu$m.

BGR—blue, green and red, also used in reference with the three primary color separations of the CCD.

TRANSFER GATE SIGNAL, TG(t), is a periodic timing signal generated by any known microprocessor, oscillator, timing or clock means to trigger a CCD photosensor array. Typically, a transfer gate signal comprises a pulse waveform or squarewave with a period substantially equal to the linetime T, and is of the form $TG(t) = TG(\omega(t-\tau))$ where $\omega$ is the angular frequency equal to $2\pi/T$ and $\tau$ is a phase shift with respect to time. If $\tau$ is a positive number, the phase shift represents a delay in time.

TRANSFER GATE RECEIVING MEANS, for example, are the pin-outs on the photosensor array, e.g., a CCD, for receiving the Transfer Gate Signal(s); the channels for receiving trigger signals and the like.

INTEGRATED SCENE—for example, in a color scanning system, the individual red, green or blue, spectrally separated images produced from the scanned pixel data. For example, at the end of a color scan, there will be three color scenes for the RGB colors which when combined form a color image. The integrated scenes illustrated herein represent the domains of pixel data where typically the spectrally separated images are not shown.

OPTICAL LINE SPACING, OLS(K+1:K), is the interchannel spacing, i.e., the distance, center to center, leading edge to leading edge, or trailing edge to trailing edge between a leading photosensor array K and a lagging photosensor K+1. Typically, the optical line or interchannel spacing is specified in units of micrometers or number of scan lines at optical resolution. It will be readily understood by one skilled in the art that since a scan line at an optical resolution has the same length in the y-direction as one optical pixel, the number of scan lines is equivalent to a number of optical pixel lengths. For example, if a CCD has a specified interchannel spacing of 22 lines and an optical pixel size of 7×7 μm, then the interchannel spacing is 154 μm.

For a trilinear CCD, the optical line spacing between the red and green sensors will be referenced with the notation OLS(R:G). (The red-green optical line spacing is equivalent to the green-red optical line spacing.) Similarly, the green-blue optical line spacing will be referenced with OLS(G:B) and the red-blue optical line spacing with OLS(R:B). In general, the optical line spacing, OLS, between a lagging K+1 and leading K photosensor array, respectively, may be hereinafter referred to as, OLS(K+1:K), where K+1 and K are lagging and leading sensors, respectively. Thus, for the typical trilinear color CCD illustrated in FIG. 4, a sequenced notation, such as, 1, 2 and 3 or $K_1$, $K_2$ and $K_3$, may be used to represent the blue, green and red photosensor arrays, respectively.

LINESKIP, is the quotient of the optical line spacing and the scanned pixel size. For example, for a trilinear color CCD, the LINESKIP represents the amount of lines necessary to skip so as to register the R, G and B scanned pixel data. The LINESKIP also represents the number of scanned pixels which physically fit into a distance defined by the optical line spacing. For a scan at optical resolution, the lineskip is simply the interchannel or optical line spacing. For other resolutions, the lineskip may be computed by the following equivalent formulas:

$$1)\ \text{LINESKIP} = \frac{\text{Optical Line Spacing}}{\text{Scanned Pixel Size}}$$

where the optical line spacing and scanned pixel size may be in units of distance, e.g., μm, or in units of optical pixel lengths.

$$2)\ \text{LINESKIP} = \text{Optical Line Spacing} \times \frac{\text{Scanning Resolution}}{\text{Optical Resolution}}$$

where the optical line spacing in equation 2 is given in units of optical pixel lines.

As above, notation may be used in referring to the LINESKIP between a given pair of photosensors. For example, LINESKIP(R:G) may be used to represent the lineskip between the red and green color photosensors. In general, the lineskip between a lagging photosensor array K+1 and a leading photosensor array K, respectively, may be hereinafter referred to as, LINESKIP(K+1:K), where K and K+1 are leading and lagging sensors, respectively.

FRACTIONAL LINESKIP—for example, in color scanning systems utilizing a trilinear CCD, a FRACTIONAL LINESKIP occurs at resolutions in which the LINESKIP, the optical line spacing between a pair of color sensors divided by the scanned pixel size, is not equal to an integer. The FRACTIONAL LINESKIP is the fractional component of the LINESKIP. For example, if the LINESKIP equals an integer I, the FRACTIONAL LINESKIP is zero; but if the LINESKIP equals an integer plus a fractional component, $n/m$ where $0<n<m$, the FRACTIONAL LINESKIP is $n/m$. Specifically, if the LINESKIP=4.8 then the FRACTIONAL LINESKIP=FRACTIONAL(4.8)=0.8.

In general, the FRACTIONAL LINESKIP between a lagging photosensor array K+1 and leading photosensor array K may be hereinafter referred to as, FRACTIONAL LINESKIP(K+1:K), where K and K+1 are leading and lagging photosensors, respectively.

It will be understood that the notation FRAC(x) may hereinafter be used on occasion to abbreviate FRACTIONAL(x). For example, FRAC(4.8)=0.8 and FRAC(5.0)=0. It will be further understood that FRAC(LINESKIP(K+1:K)) means the Fractional Component of the Lineskip between a lagging photosensor array K+1 and a leading photosensor array K, i.e., FRAC(LINESKIP(K+1:K))=FRACTIONAL LINESKIP(K+1:K).

ROUND-UP OF THE LINESKIP, RULS—if the Lineskip has a fractional component $n/m$, the ROUND-UP function of the Lineskip rounds the lineskip up to the next integer value. Therefore, for the LINESKIP=I+$n/m$ where $0<n<m$, RULS=RU(I+$n/m$)=I+1. Specifically, if the LINESKIP=4.2, then RULS=RU(4.2)=5.

BACKGROUND

In the use of prior art scanning and digital imaging systems for reflective scanning, as for example, flat-bed scanner systems, an original on an opaque substrate is placed with the surface containing the original facing down on a flat transparent reference surface, typically glass. The original document is fixed on the surface such that a line of the original, herein after referred to as a "scan line" is illuminated from below, and the light reflected from the scan line is directed through an optical system to form an image of the scan line on a sensor, such as a CCD array. The sensor, or CCD, converts the optical signal to an electronic representation of the scan line, comprising a line of digital picture elements or "pixels". Typically, the desired portion of the original is scanned by moving the illumination system, optical system and CCD sensor relative to the original along a direction hereinafter referred to as the "scanning axis" or y-axis. However, systems also exist in which the original document is moved relative to a fixed optical system.

In general, a CCD has a plurality of photosensor arrays for sensing the intensity of monochromatic, or color light (when supplied with the appropriate RGB color filter stripes). A typical trilinear color sensor, or trilinear CCD, is described in the publication entitled "An Introduction to Digital Scanning," Digital Colour Prepress volume four, Agfa Prepress Education Resources, P.O. BOX 7919, Mt. Prospect, Ill., the disclosure of which is hereby incorporated by reference. As known in the art, a typical color trilinear CCD is comprised of three rows of photosensor elements or pixels. Each row of photosensor elements, or photosensor array, is covered by a red, green or blue integral filter stripe for spectral separation. When the CCD is viewed on edge in the scanning direction, the three color pixel sensor arrays red, green and blue (RGB) are separated by a channel. Typically, the length of each channel is equivalent to an integer number of optical pixel lengths. Since the width of each RGB sensor is also an optical pixel length, the interchannel spacing between R-G and G-B sensors is equivalent to an integer number of pixel lengths. The interchannel spacing, or distance between sensors, is hereinafter referred to as the optical line spacing (OLS).

As known in the art, a pixel within a CCD sensor array is square and determines the optical resolution for a scan. For example, CCD part number KLI-8013 manufactured by the EASTMAN KODAK Company has red, green and blue sensor arrays spaced equally apart in the scanning direction by a distance of 108 μm or 12 pixels/lines. Each pixel length is 9 μm, and therefore, a square pixel measures 9×9 μm².

Typically, CCDs of the prior art have one common transfer gate receiving means so all three color sensors are activated to scan simultaneously. However, because of the optical line spacing of the CCD's photosensor elements any real time scan results in three different line scans, one for each color. At optical resolution, for example, the scan line for the blue pixels is shifted by a distance equal to the CCD optical line spacing with respect to the scan line for the green pixel data; the scan line for the green pixels is shifted by the same distance with respect to the scan line for the red pixel data and the scan line for the blue pixels is shifted by twice this distance with respect to the scan line for the red pixel data. At resolutions in which the optical line spacing divided by the scanned pixel size is an integer, there is no color misregistration. Thus, post processing and memory are all that is needed to correlate, or register, the integer shifted line scans for each color.

Heretofore, the problem which remained unresolved by color, monochromatic or digital imaging systems of the prior art related to resolution scans in which the optical line spacing divided by the scanned pixel size was not equal to an integer. Where the lineskip has a fractional component, there exists a misregistration or fractional shift in color pixel data which can not be easily registered without severely degrading overall system performance. Although it is possible to perform these other resolution scans or digital exposures with a CCD imaging system in one pass, problems of artifacts, poor image quality and color misregistration occur as a result.

In prior art imaging systems such as digital cameras and scanners where the original color scene is illuminated and converted into electronic signals via a linear CCD, typically the misregistration problem is solved by superimposing three separate scans or exposures of the original image. Each scan or exposure processes a different primary color—red, green and blue. Making multiple scans of the same original, of course, increases the amount of memory and processing needed to complete an image and accentuates problems with mechanical registration, illumination and CCD stability.

Heretofore, single pass systems of the prior art attempted to solve the fractional registration problem through extensive post processing, resampling and filtering or by simply ignoring the phase shifted data and outputting an imperfect scan. These solutions resulted in either poor quality images and/or poor system performance.

One solution for a single pass imaging system would be to increase the optical resolution of the system so that a larger sampling of data than that needed for a particular resolution is performed. The resulting "over-samplings" of pixel data could then be filtered with the extraneous data discarded. However, not only would system performance be degraded by excessively slow scan speeds but the memory requirements either on board the imaging device or elsewhere in the system would seriously degrade performance.

The present invention solves the problems of the prior art without increasing memory requirements and without extensive post processing and filtering of raw shifted pixel data. The need for time consuming multi-pass scanning or imaging is eliminated. Further, the teachings of the present invention reduce the need for CCDs with expensive precision made optical line spacings.

SUMMARY OF THE INVENTION

It is therefore a general object of the present invention to provide an apparatus for high-volume, variable resolution color or monochromatic scanning and digital imaging.

It is a specific object of the present invention to provide an imaging apparatus, including a scanning apparatus, wherein the need for post extensive processing of misregistered pixels is eliminated.

It is a specific object of the present invention to provide a digital imaging apparatus wherein the need for extensive post processing of misregistered pixels is eliminated.

It is a general object of the present invention to minimize the time needed to perform a scan.

It is a further specific object of the present invention to minimize the time needed to complete the processing of an image from a scan at resolutions other than optical resolutions.

It is a further specific object of the present invention to minimize the time to process a digital image at a plurality of resolutions.

It is a feature of the present invention that the photo to electronic conversion is performed by a sensing system employing a plurality of photosensor arrays such as a CCD, having an independent transfer gate receiving means for each photosensor.

It is another important feature of the present invention where the sensing system which employs a plurality of photosensor arrays such as a CCD, does not need to have an optical line spacing between sensor arrays (the interchannel spacing) equivalent to an integer number of optical pixel lengths.

It is another object of the present invention to produce a scanning or imaging system at reduced cost.

It is another specific object of the present invention to produce a scanning or imaging system at reduced cost by utilizing a plurality of photosensing arrays such as multi-sensor CCDs, that are manufactured with optical line spacings not equal to a precise integer number of optical pixel lengths.

To achieve the above objects and features of the present invention an imaging system is presented for producing electrical images at a plurality of selectable resolutions, comprising a sensing system further comprising a number of photosensor arrays wherein said number is an integer N greater than or equal to 2, said photosensor arrays having optical line spacings OLS(K+1:K) in reference to a leading photosensor array K and with respect to a lagging photosensor array K+1, for K equal to an integer from 1 to N−1, each of said number of N photosensor arrays further including a corresponding number of N transfer gate receiving means so that each of said N photosensor arrays is capable of being independently triggered to pass accumulated charge in the photo site into electrical signals in response to a corresponding one of a plurality of transfer gate signals, $TG_i(t)$, for i equal to an integer from 1 to N, wherein each one of said transfer gate signals has a periodicity T and angular frequency ω, said transfer gate signals being of the general form $TG_i(t)=TG_i(\omega(t-\tau_i))$.

To further achieve the above objects and features of the present invention a method is presented for registering a plurality of fractionally shifted integrated scenes for an imaging system comprising an optical system and a sensing system, said sensing system including an integer number of photosensor arrays wherein said integer is a number N greater than or equal to 2, said photosensor arrays having optical line spacings OLS(K+1:K) in reference to a leading photosensor array K and with respect to a lagging photosensor array K+1, for K equal to an integer from 1 to N−1, and wherein each of said plurality of N photosensor arrays further includes corresponding N transfer gate receiving means so that each of said N photosensor arrays is capable of being independently triggered to pass accumulated charge in the photo site into electrical signals in response to a corresponding one of a plurality of transfer gate signals, $TG_i(t)$, where i is an integer from 1 to N and wherein each one of said transfer gate signals has a periodicity T and angular frequency $\omega$, said transfer gate signals being of the general form $TG_i(t)=TG_i(\omega(t-\tau_i))$.

In one important embodiment for the present invention of an imaging system, the number of N photosensor arrays comprises three photosensor arrays, a blue photosensor array, a green photosensor array and a red photosensor array for blue, green and red color spectral separation, respectively, said blue, green and red photosensor arrays further including a blue, green and red transfer gate receiving means, respectively.

A blue transfer gate signal $TG_B(\omega t)$ corresponds to said blue transfer gate receiving means for said blue photosensor array, a green transfer gate signal $TG_G(\omega t)$ corresponds to said green transfer gate receiving means for said green photosensor array, and a red transfer gate signal $TG_R(\omega t)$ corresponds to said red transfer gate receiving means for said red photosensor array, said blue, green and red transfer gate signals being generally defined as follows: $TG_B(\omega t)=TG_B(\omega t)$; $TG_G(\omega(t-\tau))=TG_B(\omega(t-\text{FRACTIONAL LINESKIP}(G:B)\times T))$, and $TG_R(\omega(t-\sigma))=TG_B(\omega(t-\text{FRACTIONAL LINESKIP}(R:B)\times T))$; where the FRACTIONAL LINESKIP is defined as follows:

$$\text{FRACTIONAL LINESKIP}(G:B) = FRAC\left(OLS(G:B) \times \frac{\text{Optical Resolution}}{\text{Scanning Resolution}}\right).$$

THE DRAWINGS

Figure 11A:
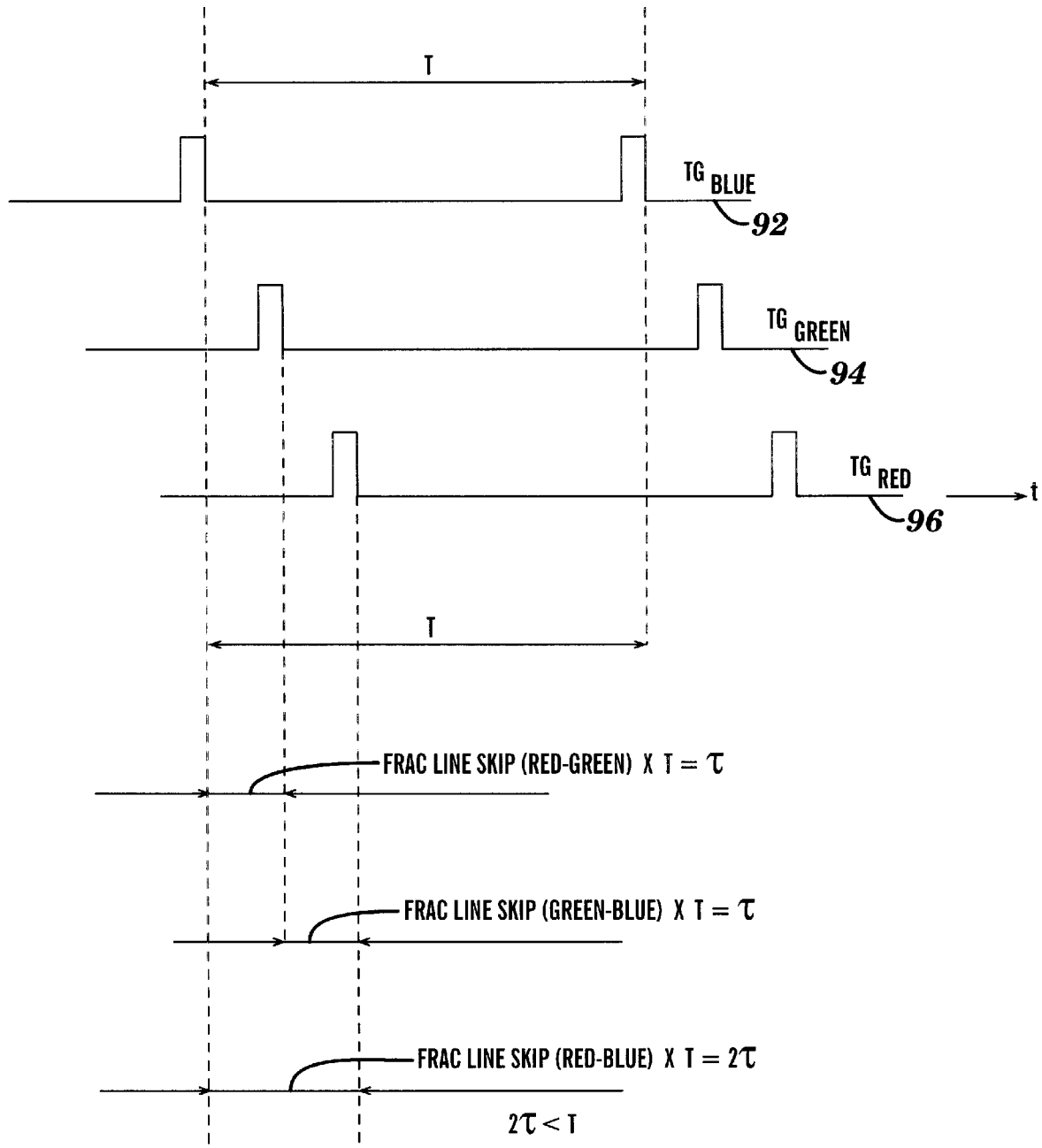
Figure 11B:
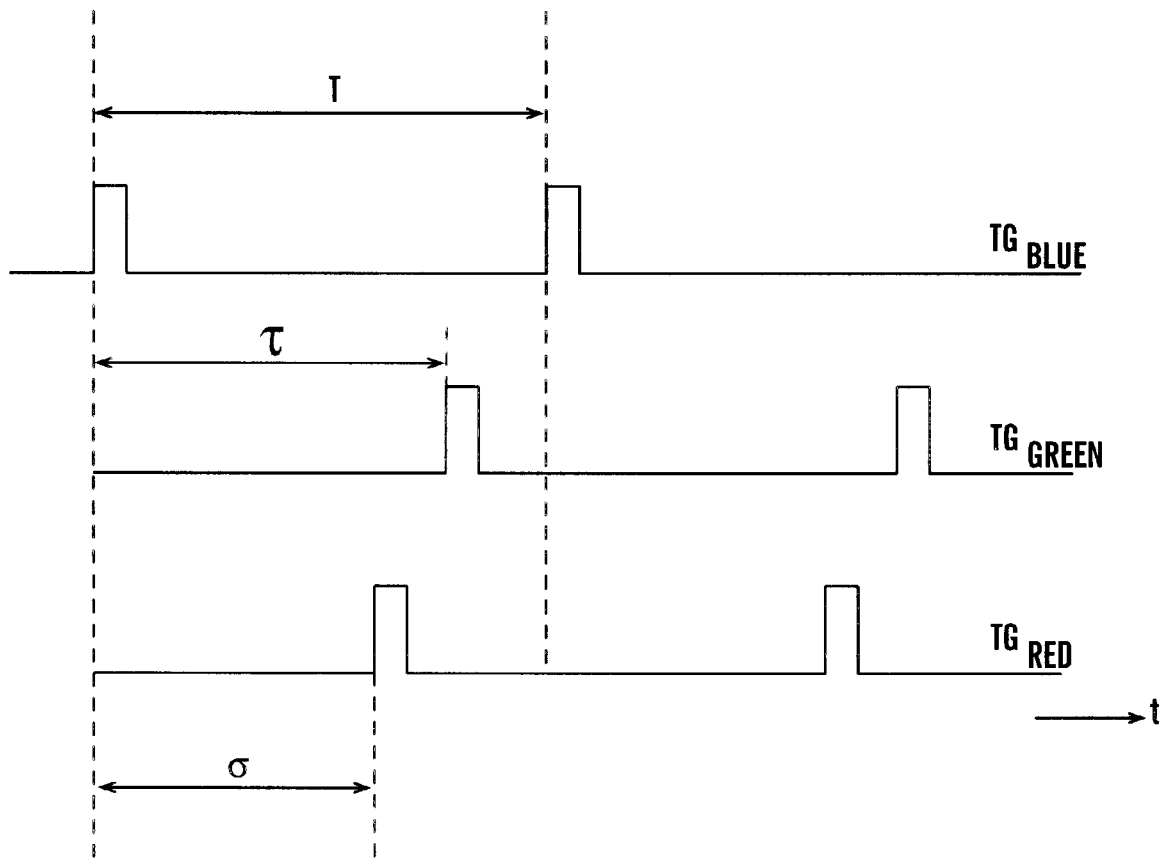

FIGS. 11A–B show how the transfer gate signals for the present invention are related through phase shifts with respect to time.

Figure 12A:
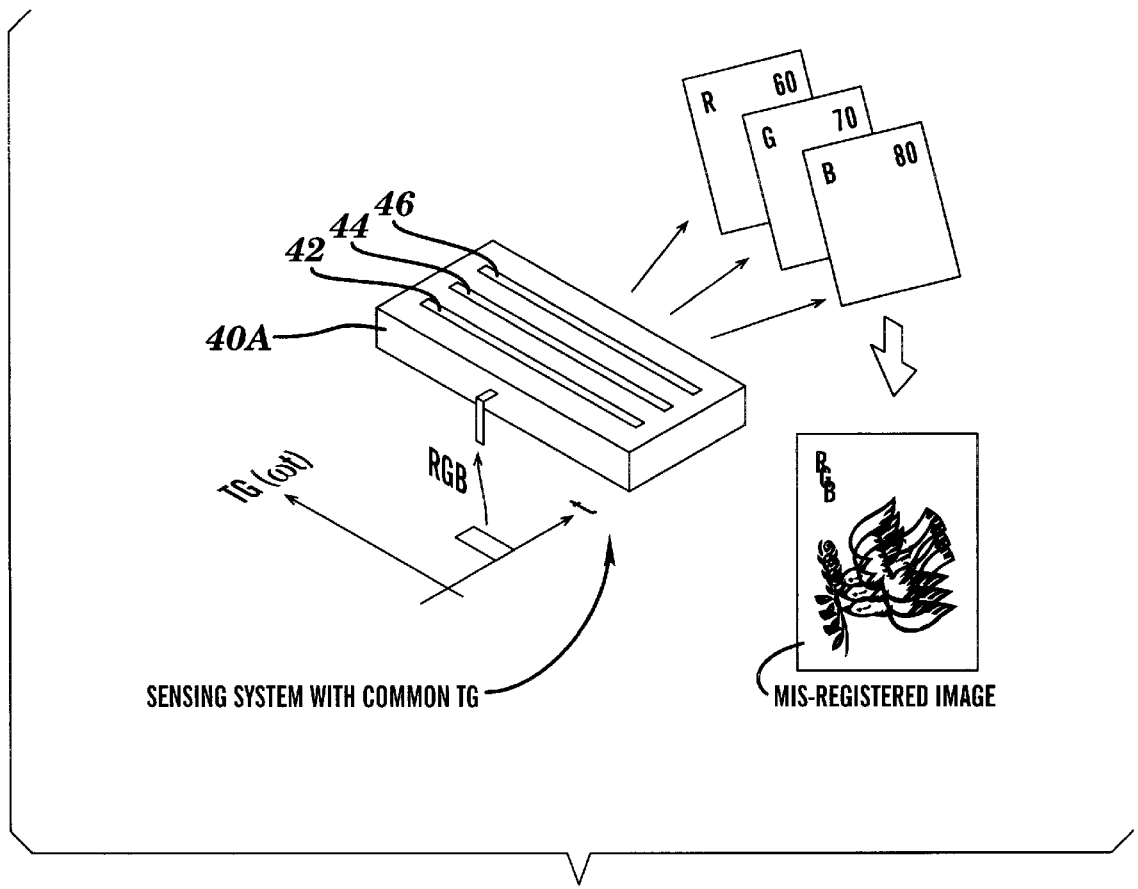
Figure 12B:
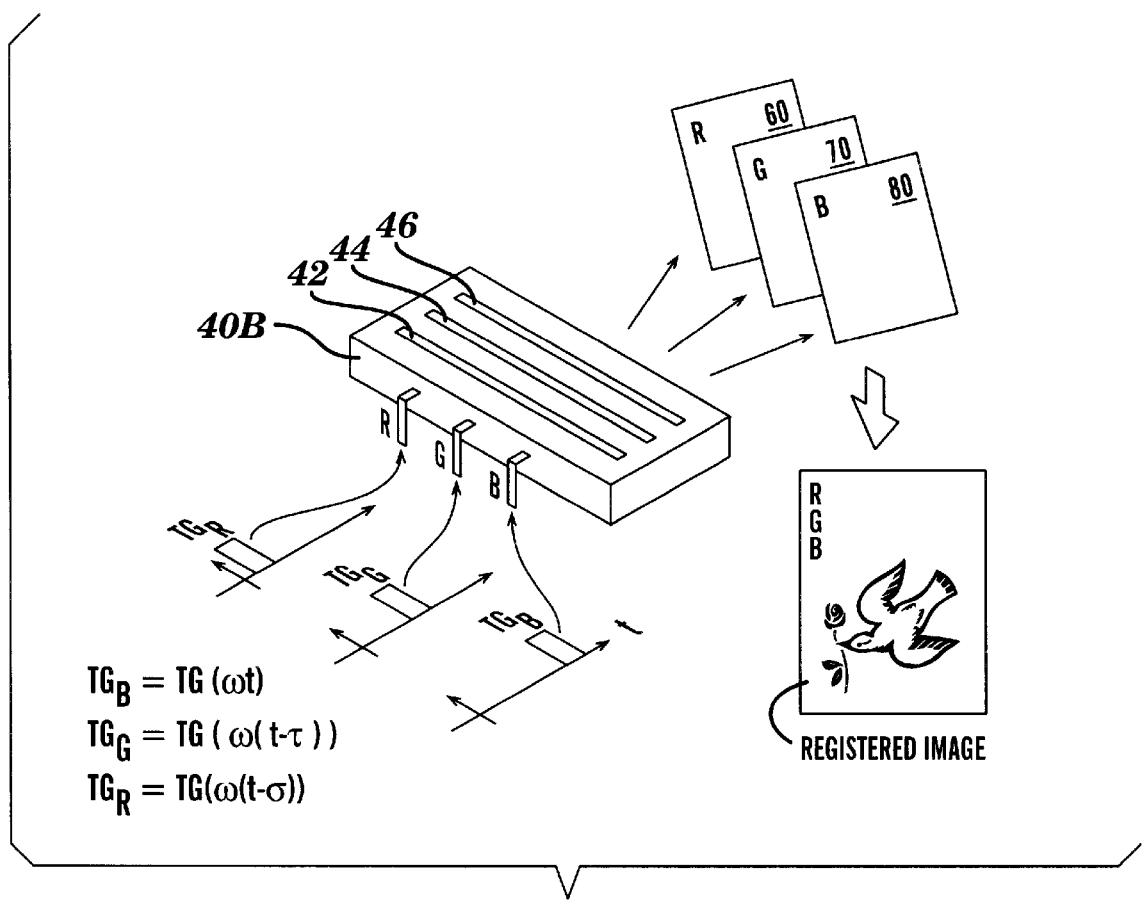

FIGS. 12A–B compare an imaging system of the prior art with the imaging system and method of the present invention.

Figure 13:
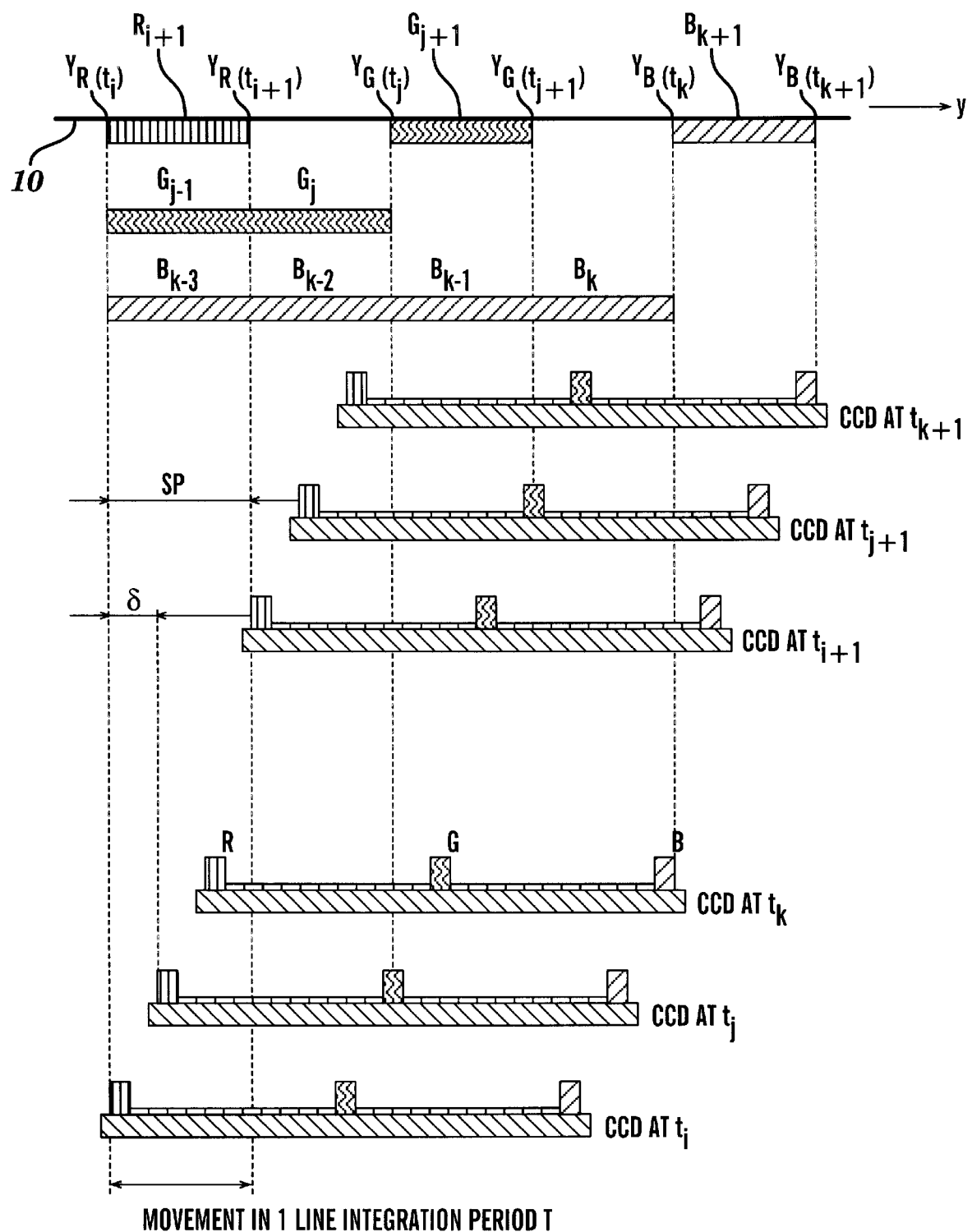
Figure 14:
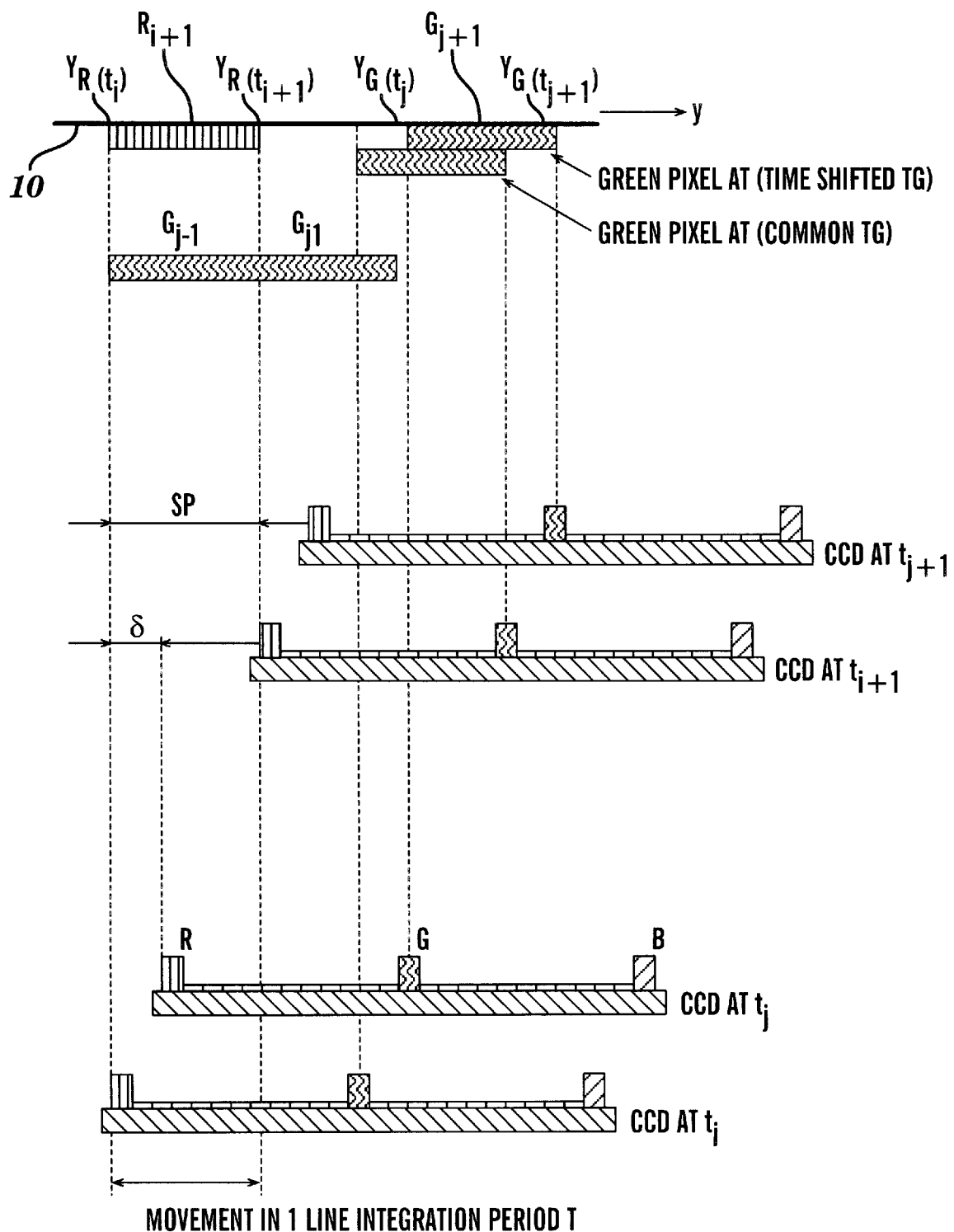

FIGS. 13–14 show how the teachings of the present invention correct for misregistration by providing time shifted transfer gate signals which register the color integrated scenes.

Figure 15A:
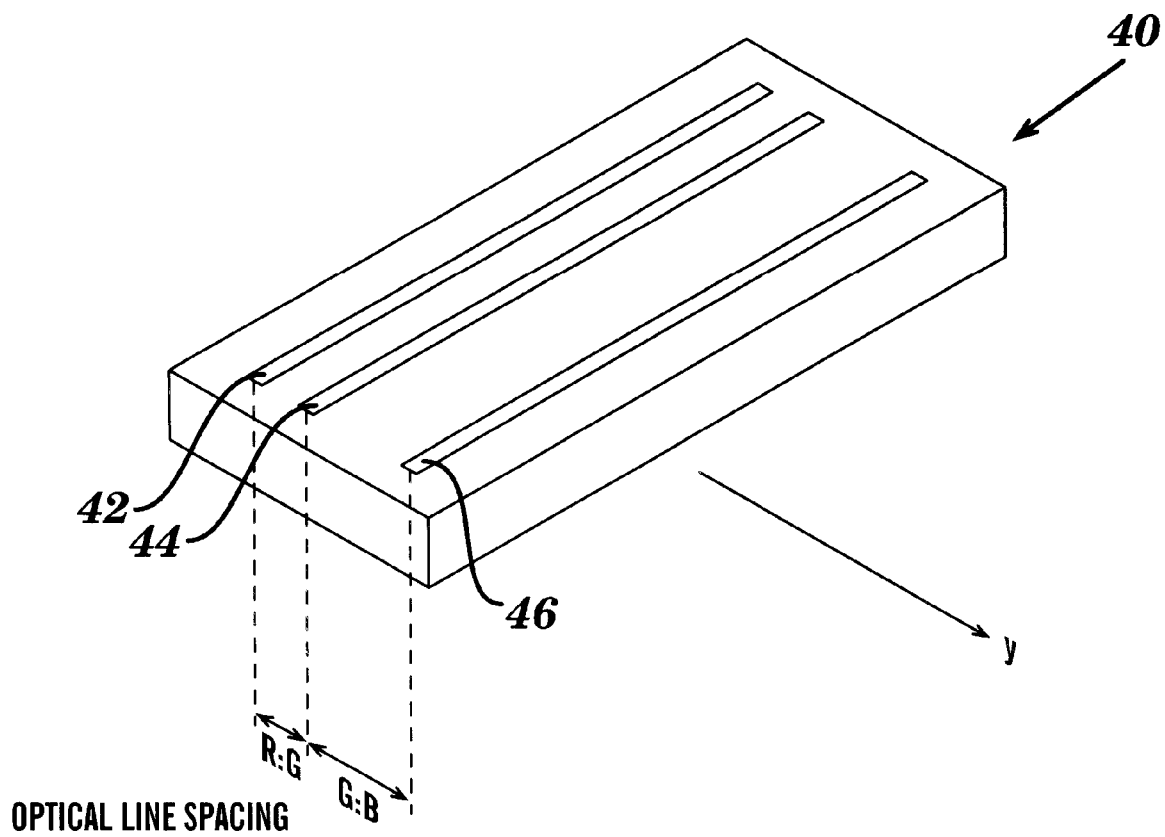

FIG. 15A is a perspective view of a multisensor CCD and shows how the present invention can be used to register shifted integrated scenes when the CCD line spacing is nonuniform and is equal to an integer.

Figure 15B:
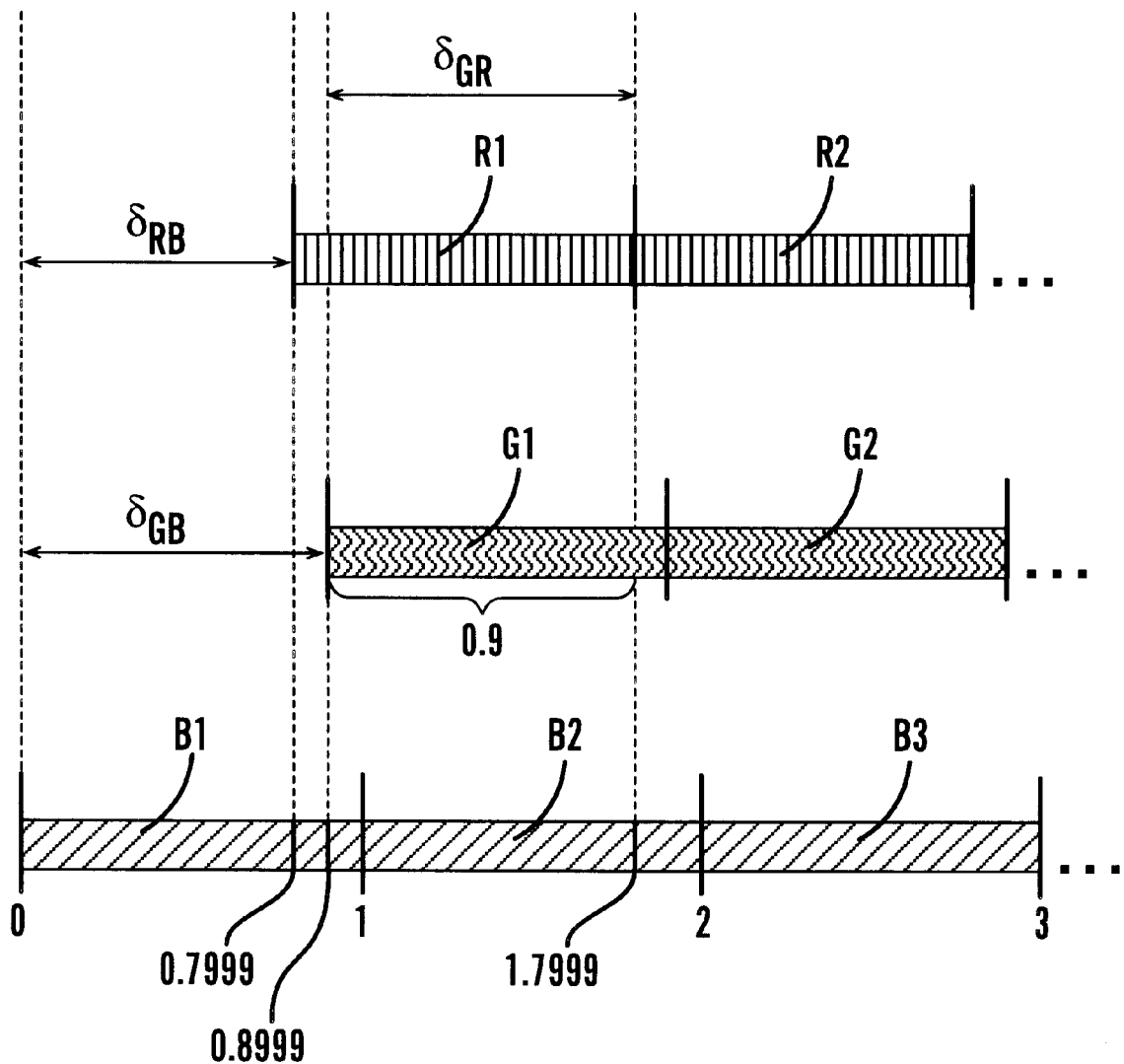

FIG. 15B shows the misregistration errors in the integrated scenes prior to correction with time the shifted transfer gate signals of the present invention.

Figure 16A:
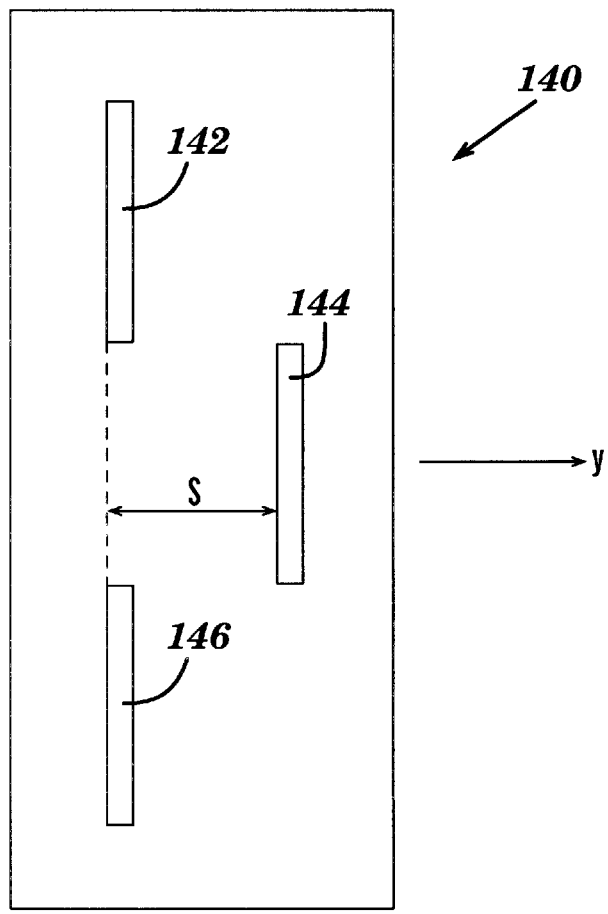

FIG. 16A is a top view of a monochromatic piecewise linear CCD which shows how the present invention can be used to register the shifted monochromatic integrated scenes when there is a fractional lineskip for a selected resolution.

Figure 16B:
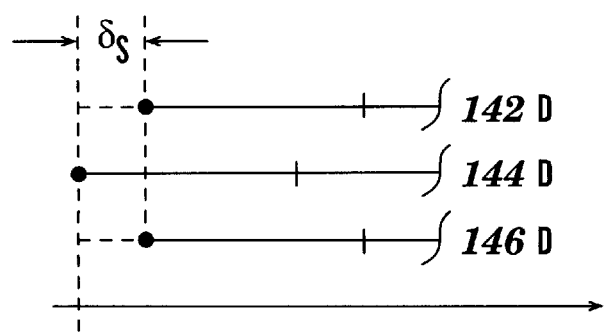

FIG. 16B shows the misregistration error prior to correction with the time shifted transfer gate signals of the present invention.

Figure 17:
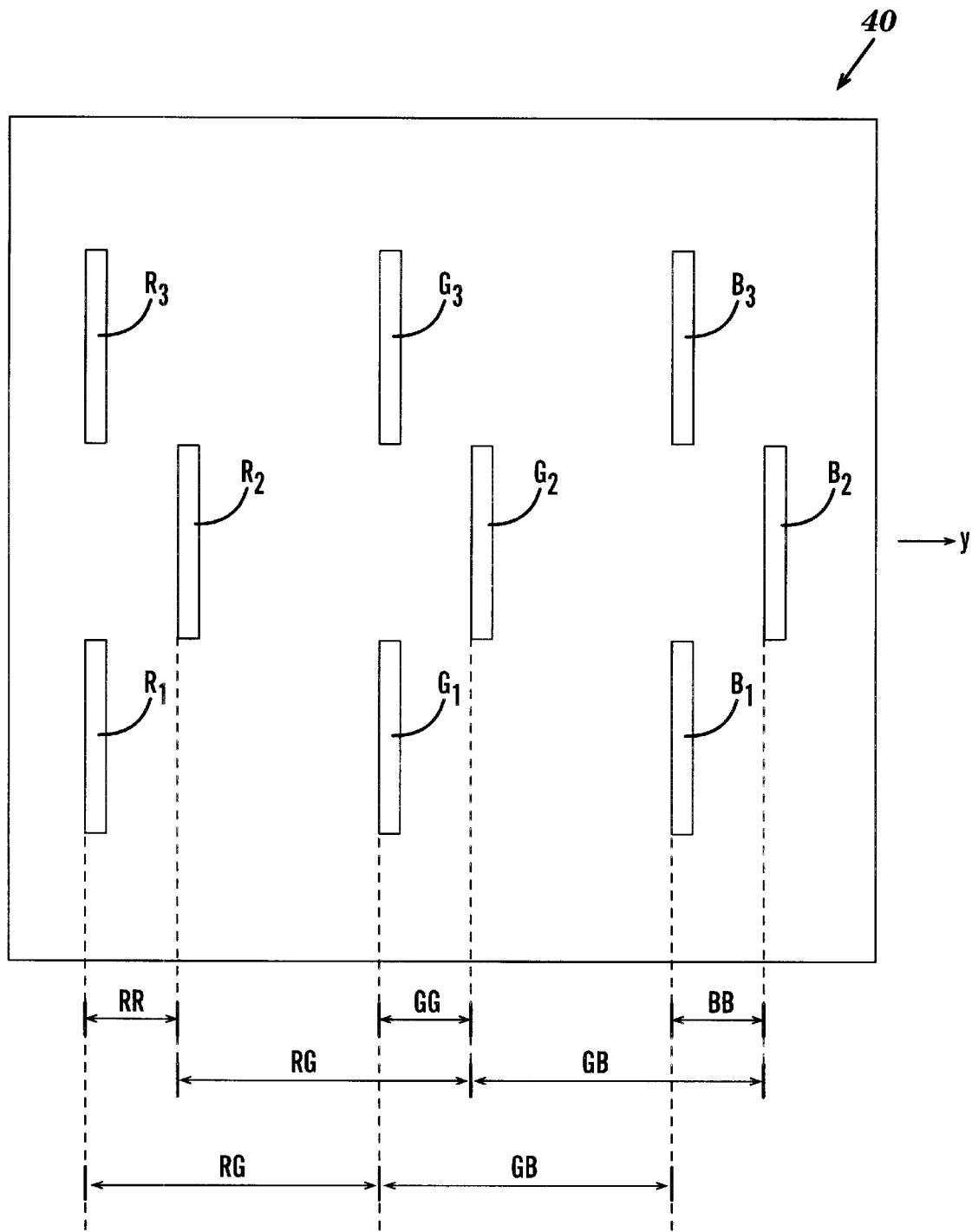

FIG. 17 is a top view of a color multi-segmented piecewise linear CCD which shows how the present invention can be used to register a plurality of shifted color integrated scenes when there is a fractional lineskip between a leading and lagging photosensor for a selected resolution.

Figure 18:
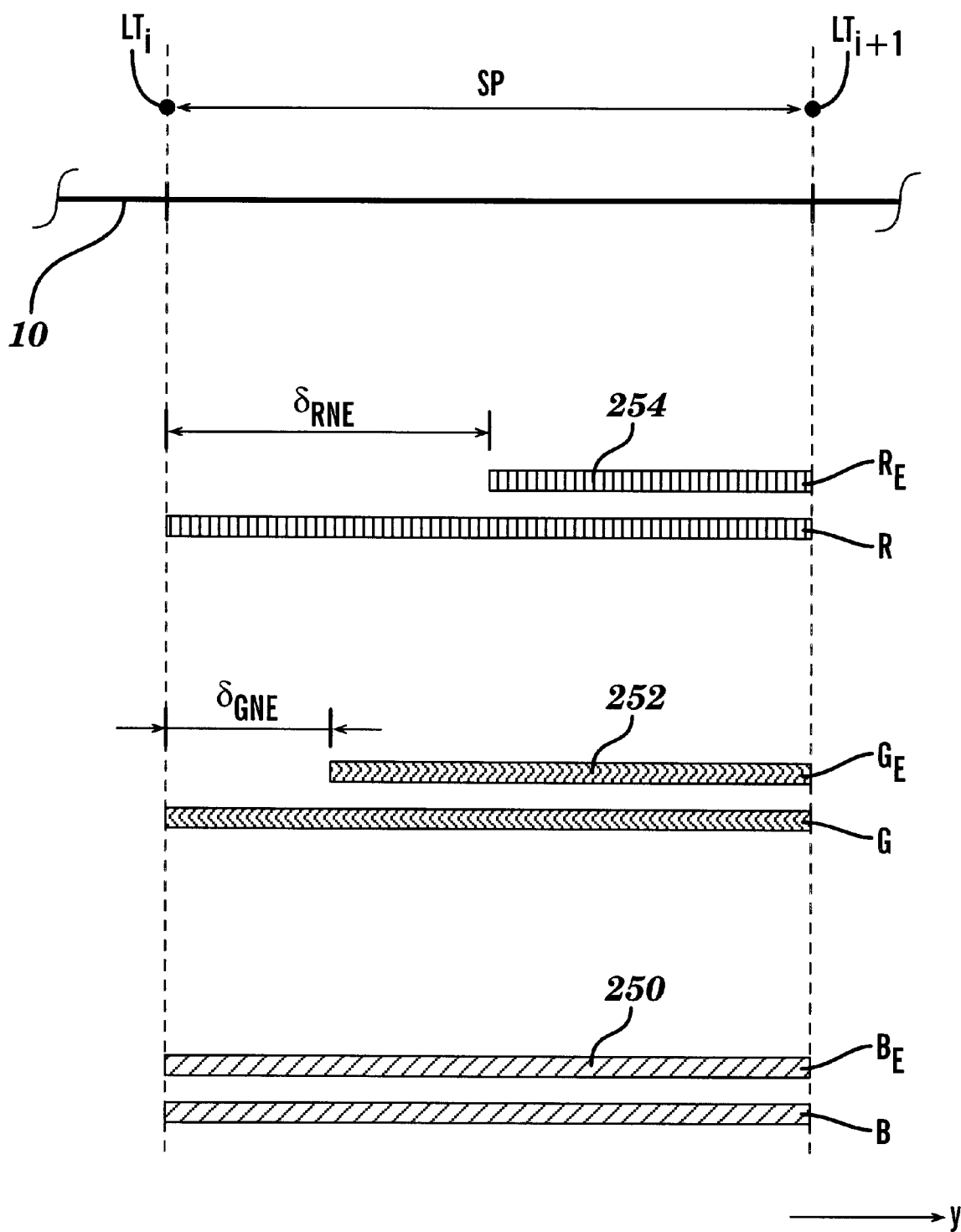

FIG. 18 shows relationship between variable exposure controls and how teachings of the present invention can be applied to register a plurality of shifted color integrated scenes when misregistration errors occur as a result of variable color exposures during a scan.

DETAILED DESCRIPTION OF THE PREFERRED EMBODIMENT

As will be readily understood by those skilled in the art, the present invention can be applied to a variety of imaging systems and methods based on sensing systems comprising a plurality of photosensor arrays such as the photosensor arrays used in Charged Coupled Device technology, including, but not limited to, transmissive and reflective optical scanning systems, high resolution scanners, color and monochrome scanners, color digital cameras and color photocopying systems and the like.

It will be further understood that in the context of Charged Coupled Device technology a photosensor array is a line sensor for scanning and imaging an electronic image from an original image; and that a plurality of photosensor arrays includes a CCD or CCD line sensing array. For example, a sensing system employing a color trilinear CCD sensor essentially comprises three photosensor arrays, one array for each RGB color. As used herein, the use of a sensing system employing a plurality of photosensor arrays includes a "CCD." And, the use of a "CCD" and "CCD array," for example, synonymously includes a sensing system which employs a plurality of photosensor arrays.

Figure 1:
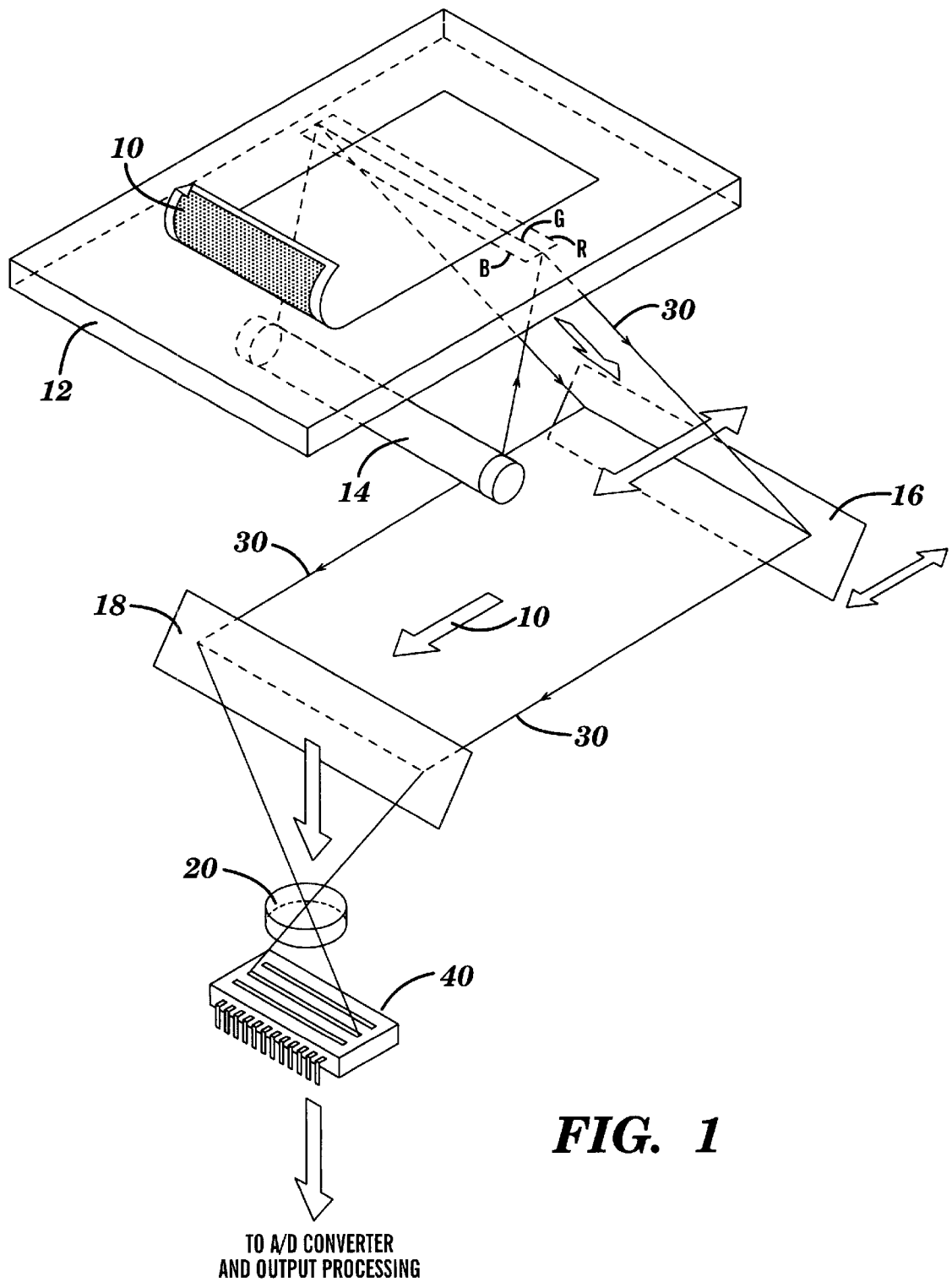
FIGS. 1–3 illustrate the interrelationships between components including a CCD of a typical imaging device such as a flat bed scanner.
Figure 2:
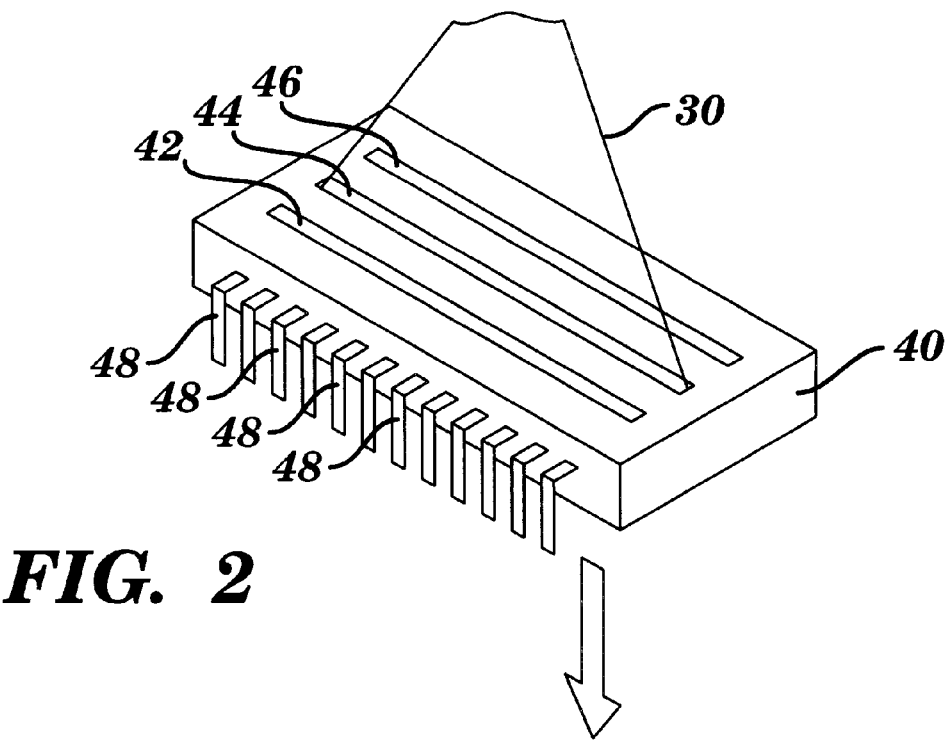
Figure 3:
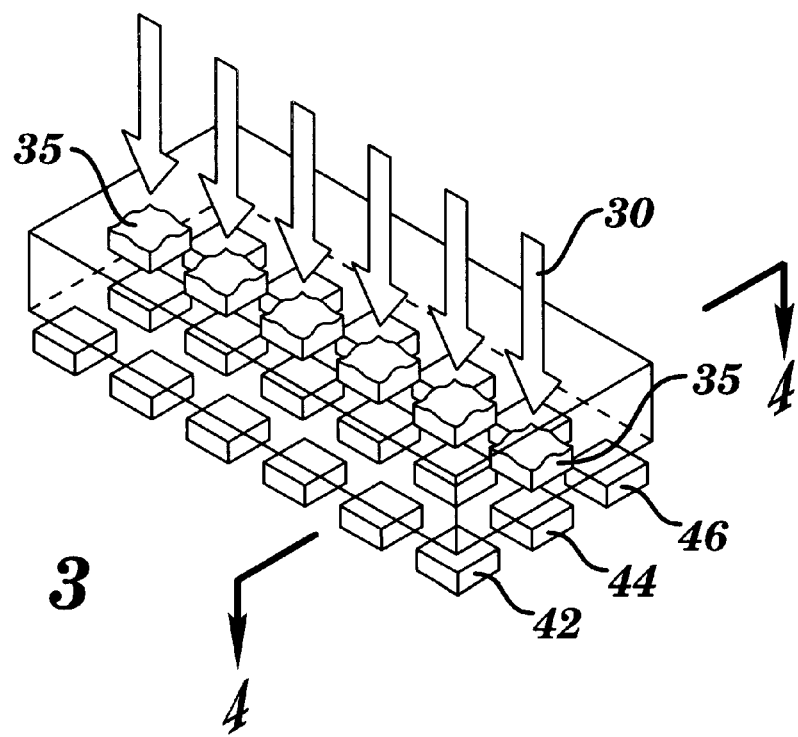

Turning now to the drawing, FIGS. 1–3 are a schematic and partial representation of a prior art imaging system based on a trilinear color photosensor array or CCD platform, comprising a reflective flatbed scanner 1 having a glass plate surface 12, an illumination system essentially comprising a light source 14, an optical system essentially comprising a plurality of mirrors 16, a magnification system essentially comprising a lens 20, a movable CCD 40, and a linear drive system (not shown). An original 10 to be scanned is placed on the glass surface 12. The original is illuminated by the light source 14 and the resulting beam of light is reflected via the pathways as shown by arrows 30 onto the top surface of the CCD 40.

During color scanning, three scan lines of the original, blue B, green G and red R, are illuminated within the beam width of white light. After exposure, the reflected light is focused by the lens 20 onto the CCD array 40. The BGR color separation is simultaneously captured by the CCD 40 with three separate rows of photosensors. Each row of photosensors has a blue, green and red filter, respectively.

FIGS. 2 and 3 illustrate, generally, how a trilinear CCD 40 having blue 46, green 44 and red 42 sensors comprises three rows of color integral filter stripes for spectral separation. For purposes of illustration only, FIG. 3 illustrates the pixel data sensed by the middle row 44, the green sensor array of light capturing elements. Generally, the CCD 40 is an analog solid state device that converts an amount of optical input 30 into a proportional amount of voltages output (indicated generally by arrows 35). The CCD sensors measure the light intensity of the reflected rays and convert the rays into analog signals. Each row of color sensors produces a plurality of electrical voltages representing the color values for a line being scanned.

As known in the art, the analog signals 35 from the CCD 40 are typically converted into digital data by a suitable Analog to Digital Converter. The digital data can then be further processed by known means to correct for imperfections in the light transmission and reflection, nonuniformities in the CCD sensor elements and analog electronics, and then further processed through a number of image processing modules to achieve the desired resolution and quality.

In the examples of prior art scanning and imaging systems described below, an optical pixel length of 9 $\mu$m is assumed for purposes of illustration. It will be readily understood by one skilled in the art that other CCDs may be illustrated where, for example, the optical line spacing is some other integer multiple of optical pixel lengths; the optical pixel size is a different length than 9 $\mu$m; and/or, the lead color sensor is for some other color than blue.

For purposes of illustration, it is assumed that the magnification system employs a magnification ratio equal to one, and only resolution scans performed at a lower than optical resolution will be described. It will be readily understood by one skilled in the art that the present invention has applications to resolutions greater than optical resolution, and to imaging systems employing other magnification ratios.

Figure 4:
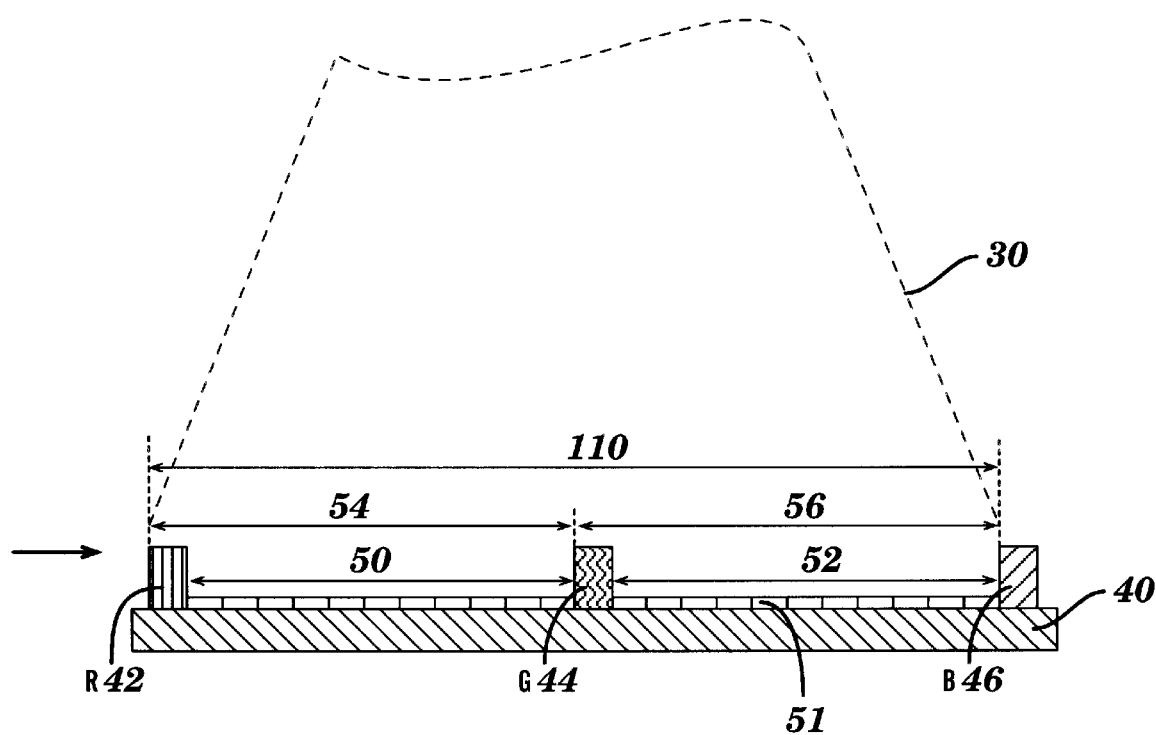
FIG. 4 is a sectioned view taken along 4—4 of FIG. 3 and a diagrammatic representation of the inner components of the CCD viewed on edge in the scanning direction, or moving direction, of the CCD.

FIG. 4 diagrammatically illustrates a cross section of a prior art CCD 40 in the scanning direction (y-direction). Typically, the blue sensor 46, also known as the master sensor, is the lead sensor in the scanning direction, which is typically followed by the green sensor 44 and red sensor 42, respectively.

The red 42 and green 44 color pixel sensor arrays, and the green 44 and blue 46 color pixel sensor arrays, are each separated by a channel 50 and 52, respectively. Typically, for trilinear CCDs channels 50 and 52 are manufactured in equal lengths, each channel length 50 and 52 being equal to an integer number of optical pixel lengths. For purposes of illustration, the lengths of channels 50 and 52 are shown as being equivalent to eleven optical pixel lengths (as indicated by hypothetical hashmarks 51).

In general, the optical line spacing, OLS, is the interchannel spacing between photosensor arrays as measured center to center, leading edge to leading edge, or trailing edge to trailing edge between the color CCD photosensor arrays. The red-green optical line spacing 54 is the interchannel spacing between the red and green photosensor arrays, hereinafter also referred to as OLS(R:G). The green-blue optical line spacing 56 is the interchannel spacing between the green and blue photosensor arrays, hereinafter also referred to as OLS(G:B). The red-blue optical line spacing 110 is the interchannel spacing between the red and blue photosensor arrays, hereinafter also referred to as OLS (R:B).

Since the width in the scanning direction of each RGB photosensor array 42, 44 and 46 is also one pixel, the OLS(R:G) 54 and OLS(G:B) 56 are each equivalent to twelve optical pixels in length, whereas, the OLS(R:B) 110 is equivalent to twenty-four optical pixels in length.

Figure 5:
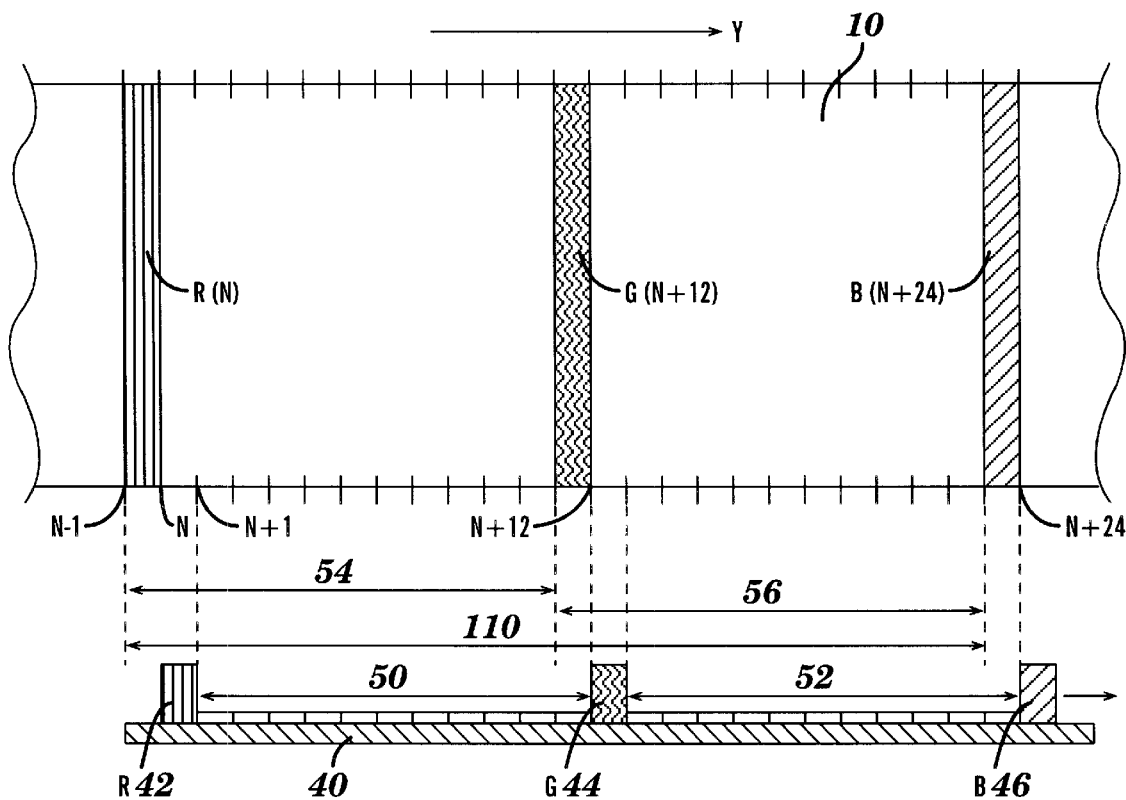
FIG. 5 illustrates how an image is scanned in real time at an optical resolution utilizing a common transfer gate system.

FIG. 5 diagrammatically illustrates how a scanning system having a CCD 40 with the above specifications performs an optical resolution scan in real time. The CCD 40 is shown in edgeview moving relative to the original 10 which is shown in topview. Lines R(N), G(N+12) and B(N+24) are the actively scanned lines at some incremental point in time, $t_{N+24}$. Each hashmark represents a 9 $\mu$m pixel length.

With further reference to FIG. 5 and this illustrative example of a prior art scanning system, a common transfer gate signal triggers all three blue 46, green 44 and red 42 color photosensors to scan simultaneously. Thus, each real time scan results in three different line scans, one for each color. FIG. 5 further shows the scan lines after N+24 lines of blue pixel data has been scanned. The currently scanned lines R(N), G(N+12) and B(N+24) are staggered by distances equal to the OLS(R:G) 54, (which in this example, is equivalent to OLS(G:B)) because of the timing of the common transfer gate signal and the uniform spacing of the CCD's RGB photosensor elements, 46, 44 and 42. FIG. 5 specifically shows how the active scan line for the blue pixels B(N+24) is shifted by a distance equal to the OLS (G:B) 56 (12 optical pixel lengths or 108 $\mu$m) with respect to the scan line for the green pixel data G(N+12). The active scan line for the green pixels G(N+12) is shifted by the same OLS(R:G) 54 (12 optical pixel lengths or 108 $\mu$m) with respect to the scan line for the red pixel data R(N). The scan line for the blue pixels B(N+24) is shifted by the OLS(R:B) 110 (24 optical pixel lengths or 216 $\mu$m) with respect to the scan line for the red pixel data R(N).

Figure 6A:
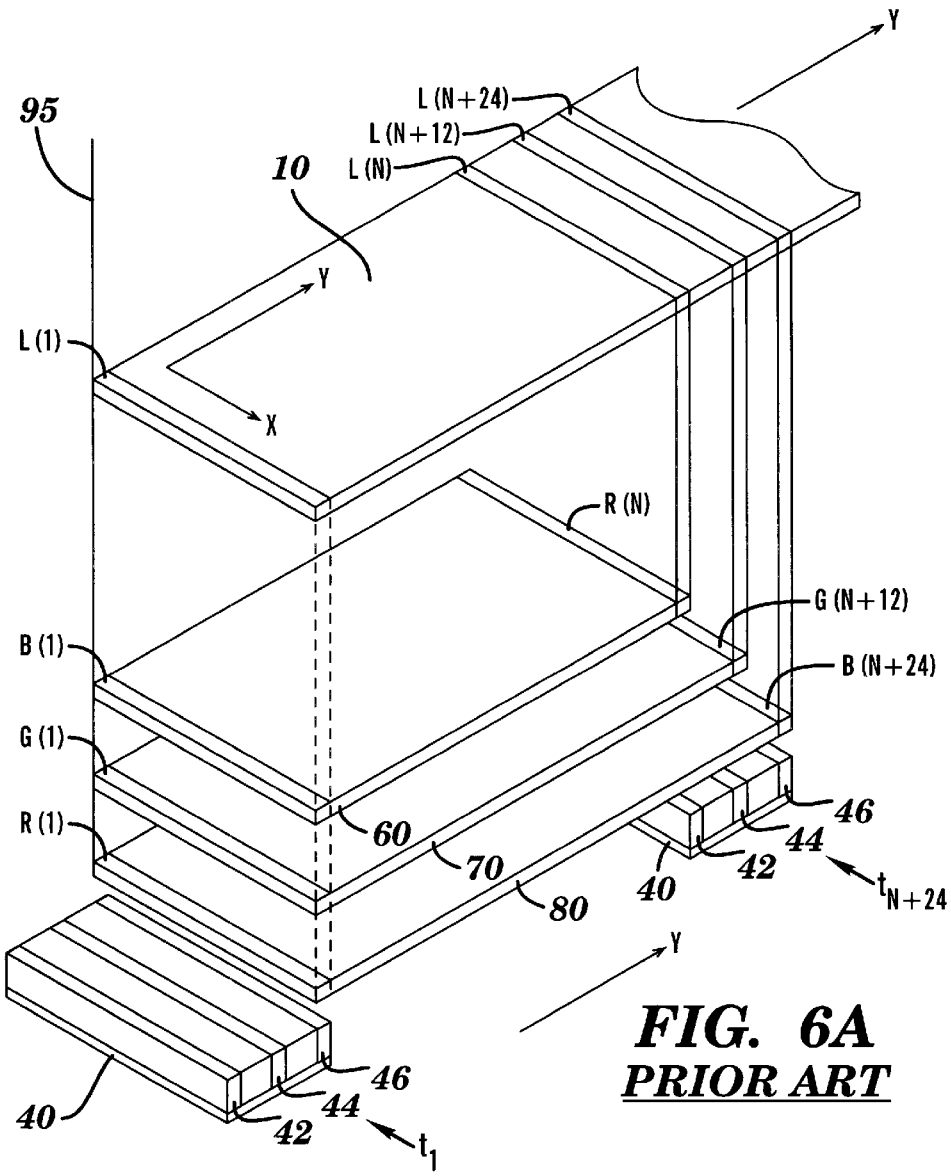
FIG. 6A is a perspective view of FIG. 5 taken along the y-axis illustrating the integrated scenes for each color, RGB, which align left justified as a result of an optical resolution scan.

FIG. 6A is a perspective view of FIG. 5 which illustrates the separate domains or integrated scenes for each color blue, green and red at time $t_1$ and $t_{N+24}$ during the scan. Each integrated scene 60, 70, 80, contains the history of pixel data for a particular color as of a particular time (intensity values not shown). The original 10 is shown with optically sized 9 $\mu$m wide RGB scan lines L(N), L(N+12) and L(N+24), actively being scanned by CCD 40. For purposes of illustration, the RGB integrated scenes 60, 70 and 80 are shown interposed between the original 10 and the CCD 40.

With further reference to FIG. 6A, the CCD 40 is schematically illustrated in two positions. The first position is at the beginning of the scan, $t_1$, where line one, L(1), has been scanned for blue pixel data by the lead blue photosensor array 46. At this point in time, the blue integrated scene 80 consists of blue spectrally separated pixels from this single scan line, B(1), whereas the green and red integrated scenes have yet to accumulate any pixel information.

The second position of CCD 40 is shown at a later point in time, $t_{N+24}$. It will be readily understood by one skilled in the art that since the linetime T is substantially constant, $t_N$=N×T. Thus, $t_{N+24}$ is N+24 units of linetime. At this point in time, the blue integrated scene 80 comprises N+24 lines of blue pixel data (lines B(1) through B(N+24). FIG. 6A further shows how at $t_{N+24}$ the green integrated scene 70 comprises lines G(1) through G(N+12) of green pixel data and similarly, how the red integrated scene 60 comprises lines R(1) through R(N) of red pixel data.

Figure 6B:
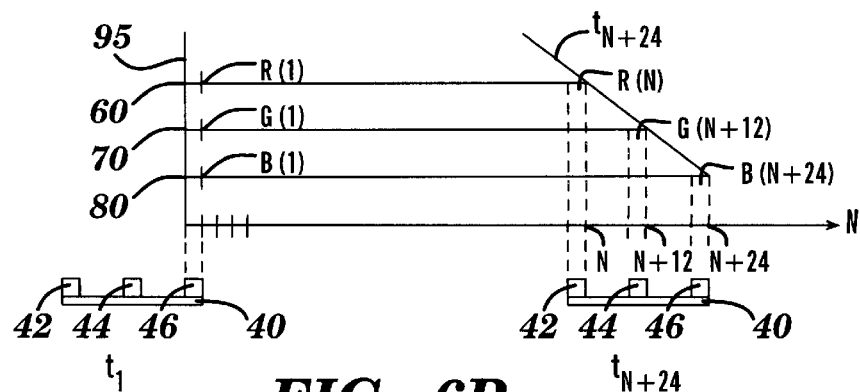
FIG. 6B is an edge-view diagram of FIG. 6A taken along the y-axis illustrating the integrated scenes for each color, RGB, which align left justified as a result of an optical resolution scan.

FIG. 6B is a schematic and edgeview of FIG. 6A. Vertical line 95 shows when an optical resolution scan is performed, the RGB pixel domains, 60, 70 and 80, are registered, i.e., they vertically align, left justified, as shown at 95. For example, the first line scan for red R(1) vertically aligns with the first line scan for green G(1) and similarly, there is alignment with the first scan line for blue B(1). Upon completion of the scan each of the scan lines R(N), G(N), and B(N) from integrated scenes 60, 70 and 80 respectively, correspond to the Nth physical location with respect to the original 10.

FIG. 6B further shows how with respect to diagonal line $t_{N+24}$, there is only enough real time data to image N lines of RGB scan lines. Thus, it will be readily understood from FIGS. 5 and 6 that as of $t_{N+24}$, notwithstanding the fact that N+24 blue lines have been scanned, only a full compliment of N blue, green and red scan lines may be imaged. For scanning and imaging systems with limited memory, the ability to output N lines of video data may be an important feature.

The lineskip, generally, is the quotient of the optical line spacing and the scanned pixel size. For a scan at optical resolution the lineskip is the interchannel or optical line spacing in units of scan lines. The lineskip represents the amount of lines necessary to skip so as to register the R, G and B scanned pixel data. Specifically in this example, three lineskips of interest may be computed as follows:

$$\text{Lineskip}(R:G) = \frac{\text{Optical Line Spacing }(R:G)}{\text{Scanned Pixel Size}} = \frac{108 \text{ µm}}{9 \text{ µm}} = 12$$

$$\text{Lineskip}(G:B) = \frac{\text{Optical Line Spacing }(G:B)}{\text{Scanned Pixel Size}} = \frac{108 \text{ µm}}{9 \text{ µm}} = 12$$

$$\text{Lineskip}(R:B) = \frac{\text{Optical Line Spacing }(R:B)}{\text{Scanned Pixel Size}} = \frac{216 \text{ µm}}{9 \text{ µm}} = 24$$

It will be appreciated from FIGS. 5–6 that at $t_{N+24}$, B(N) can be accessed from the blue integrated scene 80 by counting back 24 lines, the lineskip(R:B), from the current blue scan line B(N+24). Similarly, G(N) can be accessed from the green integrated scene 70 by counting back 12 lines, the lineskip(G:B) from G(N+12). R(N) can be accessed without counting back any lines. Thus, the lineskips provide a reference for registering scan lines.

Continuing with the above CCD parameters, and with general reference to FIGS. 5–6, if a scan is performed at a non-optical resolution in which the lineskips remain integers, the integrated scenes for each color remain in a left justified alignment similar to those illustrated in FIG. 6B. As a specific example, if the scanning resolution is reduced to half the optical resolution, i.e., from 4,000 to 2000 dpi, the scanning speed and hence the size of a scanned pixel is doubled from 9 µm to 18 µm so that the amount of pixel information sampled is cut in half. However, at this half-resolution the optical line spacing between color sensors divided by the scanned pixel dimension remains equal to an integer value. Thus, for this half-resolution scan, the integrated scenes remain left justified and there is no color registration problem. In general, when the optical line spacing divided by the sampled pixel size equals an integer simple post processing and memory requirements may be used to correlate, or register, the shifted line scans for each color.

Figure 7:
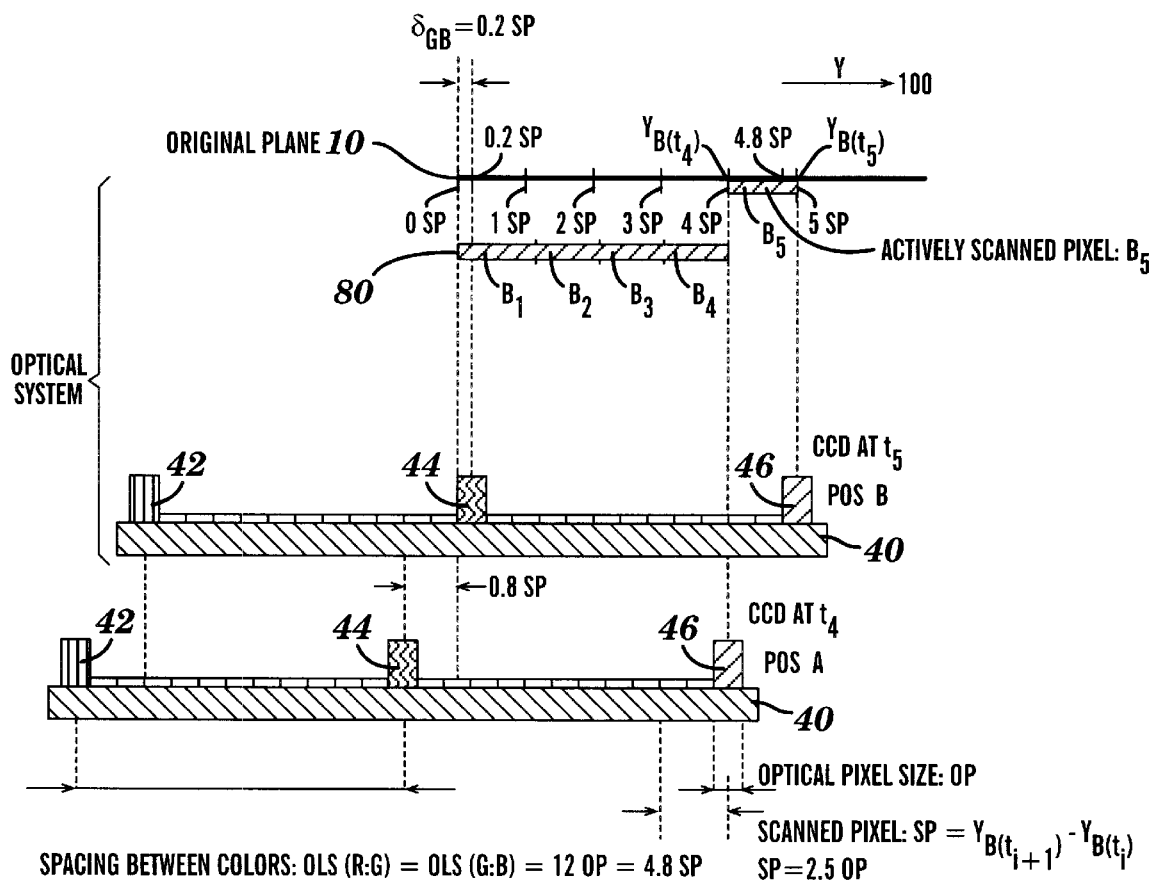
FIGS. 7–9 illustrate the general misregistration errors which occur when the lineskip has a fractional component, the fractional lineskip, for resolutions in which the optical line spacing divided by the sampled pixel size is not equal to an integer.

FIG. 7 shows how for a 1,600 dpi resolution scan (scanning resolution=0.4×4,000 dpi optical resolution) the scanned pixel size SP is sampled at 2.5 times the rate of the optical resolution scan (velocityscan=2.5×velocity$_{optical}$). Thus, the ratio of the scanned pixel length to the optical pixel length is 2.5 to 1. The relative lengths of the scanned pixels and optical pixels are shown as SP and OP, respectively, located above the original 10.

It will be appreciated how FIG. 7 shows the beginning of a low resolution 1,600 dpi scan shown edgeview in the y-direction 100. Each line is represented by a pixel width in the y-dimension. Since the beginning of a scan is depicted in FIG. 7, only the blue 46 photosensor of the CCD 40 is shown beneath the original plane 10. The lineskip(G:B) which is the green-blue optical line spacing 56, (OLS(G:B)= 108 µm), divided by the scanned pixel size, (SP=22.5 µm), equals 4.8 scan lines. The fractional lineskip, which has been defined as the fractional component of the lineskip, equals 0.8 of a scan line (FRAC(4.8)=0.8).

With reference to FIG. 7, the CCD 40 is shown at two positions in time $t_4$ and $t_5$. The first position, POSITION A, is at $t_4$ when the blue photosensor 46 has completed scanning line 4 with respect to the original plane 10 (YB($t_4$)= 4SP) . At $t_4$, the green photosensor 44 has yet to reach the original plane 10 (YG($t_4$)=−0.8SP). The end of integration of light for line 4, at $t_4$, is also the beginning of the integration of light for line 5. The 4 lines that have been integrated by the blue photosensor are shown as $B_1$–$B_4$ of the blue integrated scene 80. From $t_4$ to $t_5$, position A to B respectively, the blue photosensor 46 scans line 5 from the original and produces a blue line 5 as indicated by $B_5$ located immediately beneath the original 10. It will be appreciated that the relative location of any blue scanned pixel $B_N$ equals the reference point designated by N×SP with respect to the original since the blue sensor 46 is the lead photosensor of the CCD 40.

A particular point in interest occurs at $t_4$+0.8T where the blue photosensor 46 has integrated 0.8 of the fifth line, (YB($t_{4.8}$)=4.8SP). At this point in time, 4.8 units of linetime into the scan, the green photosensor 44 arrives at the beginning of the original 10, (line zero).

The second position, POSITION B, is at $t_5$, when the blue photosensor 46 is at the end of line 5 or the beginning of line 6 with respect to the original. At this point in time $t_5$ (5 units of linetime) the blue photosensor 46 will have integrated 5 blue scan lines. However, while the blue photosensor 46 is at the end of line 5 (YB($t_5$)=5SP) the green photosensor is at 0.2SP with respect to the original 10 (YG($t_5$)=0.2SP).

Figure 8:
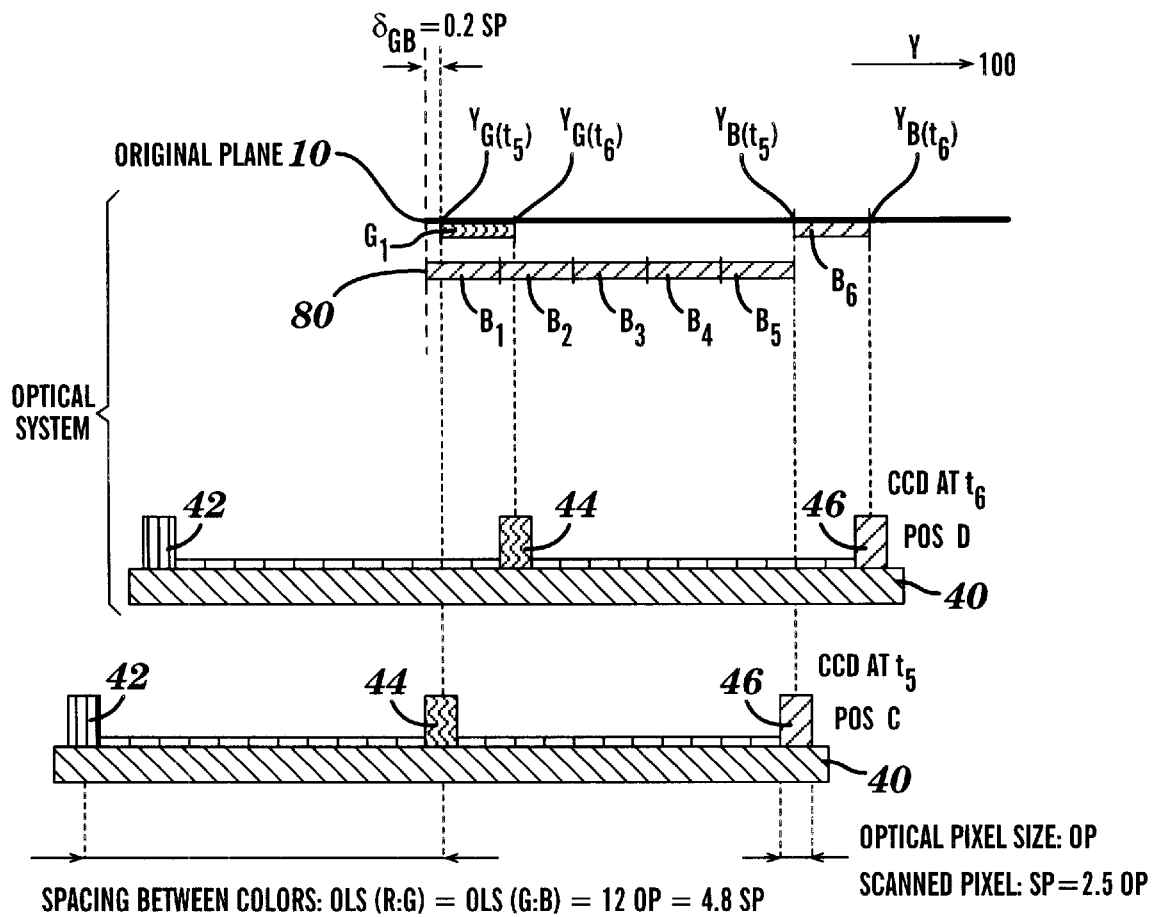

FIG. 8 illustrates the scan of lines G(1) and B(6) respectively. The CCD 40 is shown at two positions in time, $t_5$ and $t_6$. The first position, POSITION C, is at $t_5$. This is the beginning of G(1) and B(6) respectively. The second position, POSITION D, is at $t_6$, when the green and blue photosensors are at the end of G(1) and B(6), respectively. At this point in time $t_6$ (or 6 units of linetime) the blue photosensor 46 has integrated 6 blue lines and the green photosensor 44 has integrated 1 green line.

Since the prior art scanning system illustrated in FIGS. 7–10 utilizes a common transfer gate for all the three color photosensors, the green photosensor 42 will not begin to integrate light until it is at 0.2 of a scan line with respect to the original 10 (YG($t_5$)=0.2SP). When the green and blue integrated scenes 70 and 80 are combined, there will be a misregistration error $\delta_{GB}$ equal to 0.2 scanned pixel length or 4.5 μm. The misregistration $\delta_{BG}$ is defined as follows:

$$\delta_{GB} = 1 - \text{FRACTIONAL LINESKIP}(G{:}B)$$

$$\delta_{GB} = 1 - FRAC\frac{\text{Optical Line Spacing }(G{:}B)}{\text{Scanned Pixel Size}}$$

$$\delta_{GB} = 1 - FRAC(108\ \mu m / 22.5\ \mu m)$$

$$\delta_{GB} = 1 - FRAC(4.8) = 0.2$$

FIGS. 7–8 illustrate how the lineskip may be visualized as the number of scanned pixels which fit in the optical line spacing. In this example, 4.8 scanned pixels fit in the optical line spacing between the green and blue photosensors. As a result of a common transfer gate signal the green sensor arrives at the beginning of line 1 out of synchronization with respect to the blue sensor's first scan B(1). Thus, when the lineskip is not equal an integer, there will be a misregistration in the green and blue integrated scenes as illustrated. In this specific example, the location of the green scan line G(1) is equal to the location of the blue scan line B(1)+$\delta_{GB}$, where $\delta_{GB}$ is 0.2 of a scanned pixel length, ($Y_{G(1)}=Y_{B(1)}+0.2$ SP).

Figure 9:
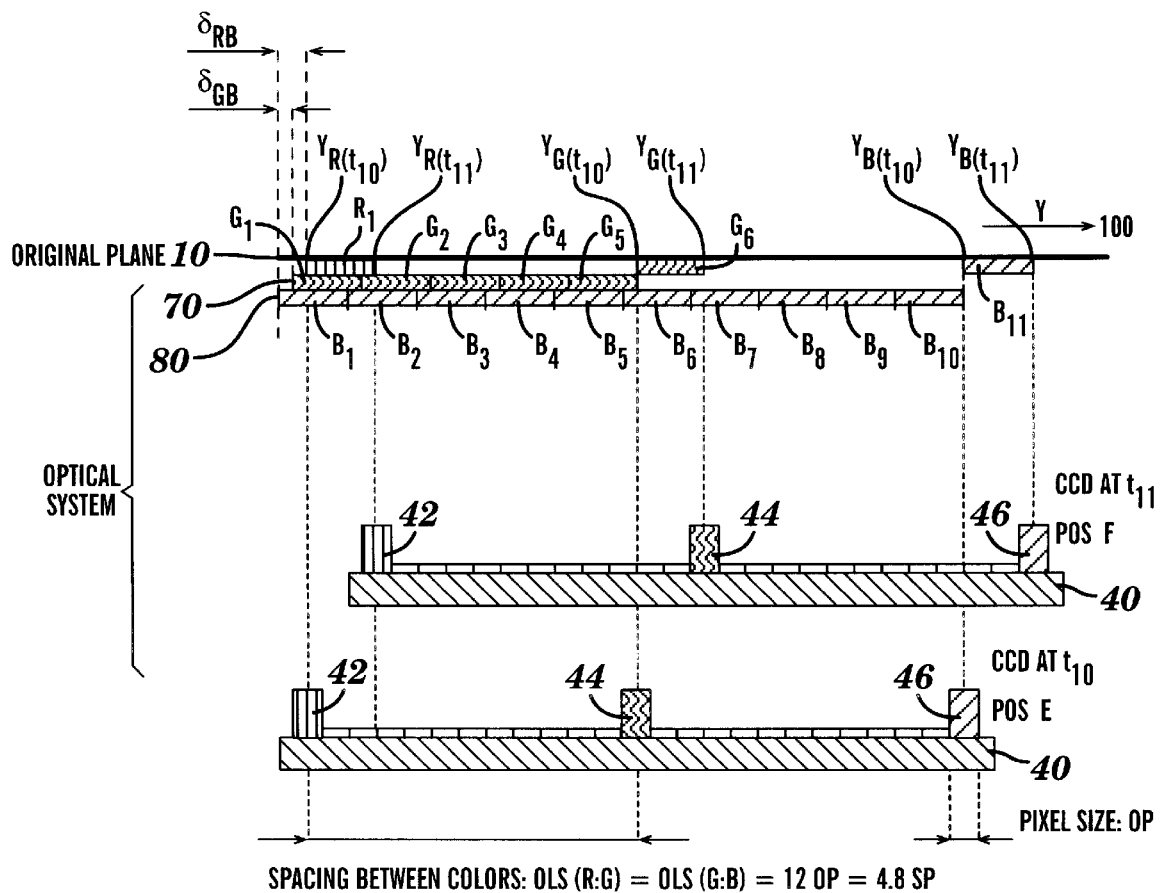

FIG. 9 illustrates the scan of lines R(1), G(6) and B(11), respectively. The CCD 40 is shown at two positions in time, $t_{10}$ and $t_{11}$. The first position, POSITION E, is at $t_{10}$. This is the beginning of the integration of lines R(1), G(6) and B(11), respectively. The second position, POSITION F, is at $t_{11}$. This is the end of the integration of lines R(1), G(6) and B(11), respectively. The integrated scenes for green 70 and blue 80 are shown below. Since the red sensor 42 is integrating its first line R(1) the red integrated scene 60 is not shown. When the blue 80, green 70 and red 60 integrated scenes are combined, the misregistration between the red and blue integrated scenes $\delta_{RB}$ equals 0.4 scanned pixel length, or 9 μm. The misregistration $\delta_{RB}$ is defined as follows:

$$\delta_{RB} = 1 - \text{FRACTIONAL LINESKIP}(R{:}B)$$

$$\delta RB = 1 - FRAC\frac{\text{Optical Line Spacing }(R{:}B)}{\text{Scanned Pixel Size}}$$

$$\delta_{RB} = 1 - FRAC(216\ \mu m / 22.5\ \mu m)$$

$$\delta_{RB} = 1 - FRAC(9.6) = 0.4$$

Figure 10:
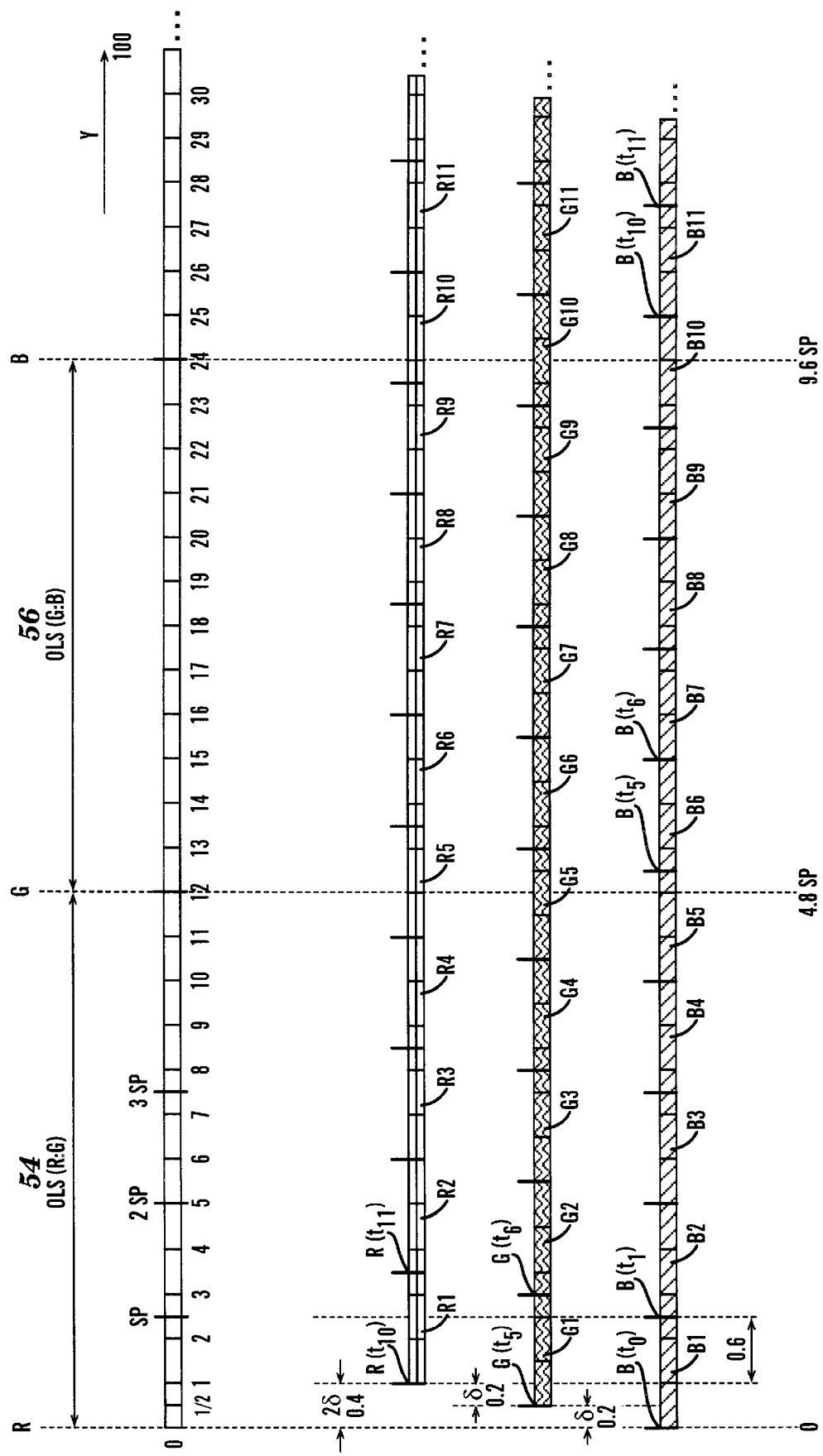
FIG. 10 is an edge-view diagram taken along the y-axis illustrating the integrated scenes for each color, RGB, which misregister and do not align left justified when a scan is performed at resolution in which the lineskip has a fractional component, (fractional lineskip).

FIG. 10 shows in part the resulting BGR color integrated scenes 80, 70 and 60, respectively for a completed 1,600 dpi scan. The blue 80, green 70 and red 60 integrated scenes are shown in physical relation to the original 10. For purposes of reference, the original 10 has been marked off in optical pixel increments OP equal to 9 μm. A scanned pixel width is shown by SP as being equivalent to 2.5 optical pixels in length (22.5 mm).

FIG. 10 shows in part, how the misregistration errors $\delta_{RG}$ $\delta_{GB}$, $\delta_{RB}$ cause the misregistration of scanned pixel data throughout the blue 80, green 70 and red 60 integrated scenes. It will be appreciated from the above example that while the blue sensor 46 is integrating B(N) from $t_{N-1}$ to $t_N$, the green sensor is integrating the G(N–5) from $t_{N-1}$ to $t_N$, and, the red sensor is integrating the R(N–10) from $t_{N-1}$ to $t_N$. In general, when the blue sensor is integrating B(N), the green sensor is integrating the G(N-RULS(G:B)) and the red sensor is integrating the R(N-RULS(R:B)). Where RULS has been defined as the function which computes the round-up of the lineskip when the there is a fractional component. The round-up of the green-blue lineskip, RULS(G:B), is the round-up of 4.8 which equals 5. The round-up of the red-blue lineskip RULS(R:B) is the round-up of 9.6 which equals 10.

FIG. 10 further shows how at this 1,600 dpi resolution scan the amount of misregistration $\delta_{GB}$ between scan lines green G(N) and blue B(N) is equal to 0.2 of a scanned pixel length, or 4.5 μm, which is equivalent to half of an optical pixel length. The amount of misregistration $\delta_{RB}$ between scan lines green R(N) and blue B(N) is equal to 0.4 of a scanned pixel length, or 4.5 μm, which is equivalent to one optical pixel length. The red integrated scene 60 is shifted in length by a distance of $\delta_{RG}$ with respect to the green integrated scene 70 ($\delta_{RG}$=0.2 SP=0.2×22.5 μm=4.5 μm) and by a distance of $\delta_{RB}$=2 $\delta_{GB}$ with respect to the blue integrated scene 80.

In general, the physical location of the BGR scan lines are related as follows:

$Y_{R(N)}=Y_{G(N)}+\delta_{RG}=Y_{B(N)}+\delta_{RG}+\delta_{GB}$ $Y_{G(N)}=Y_{B(N)}+\delta_{GB}$ $Y_{B(N)}=Y_{L(N)}$ where $\delta_{RG}$ is the misregistration error between red and green integrated scenes $\delta_{RG}$=1–FRACTIONAL LINESKIP(R:G); $\delta_{GB}$ is the misregistration error between green and blue integrated scenes $\delta_{GB}$=1–FRACTIONAL LINESKIP(G:B); and $\delta_{RB}$ is the misregistration error between red and blue integrated scenes $\delta_{RB}$1–FRACTIONAL LINESKIP(R:B).

FIGS. 11A shows, generally, how the present invention overcomes the misregistration problem by providing three time shifted transfer gate signals 92, 94 and 96 for each BGR color sensor 42, 44 and 46 respectively. Each time shifted transfer gate signal 92, 94 and 96 has the same periodicity T equal to the linetime.

The time shifted transfer gate signals are transmitted to a CCD having three independent transfer gate receiving means. CCDs having a plurality of independent transfer gate receiving means are known in the art. For example, part no. KLI 10203 produced by the EASTMAN KODAK Company is a trilinear CCD having three lines of 10,200 CCD elements each line with its own built-in color filter (BGR). This CCD has receiving means for separate configurable exposures for BGR. The CCD may be driven by any suitable clock means as timing generators and clock mechanisms are well known in the art.

It will be further understood by one skilled in the art that a CCD having independent transfer gate receiving means need not be triggered by individual transfer gate generators such as clock mechanisms and the like. As is well known in the art, a plurality of transfer gate signals with varying periods may be generated from harmonically related waveforms. In which case the above time-shifted transfer gate signals may be effectively generated by multiplexing the harmonics. Further, any known microprocessor, oscillating device or clock means may be used to generate the transfer gate signals. Thus, it will be understood that the illustrated transfer gate signals are not intended to be limiting and may be generated by any equivalent means as known in the electronics art.

For the present invention, each time shifted transfer gate signal triggers an independently timed line scan for a particular color. Hence, if blue is the first photosensor followed by green and then by red, a first transfer gate signal, BLUE TG signal 92, is directed to the blue transfer gate receiving means for triggering a scan with the blue sensor. This is followed by a time shifted transfer gate signal for triggering the green sensor, GREEN TG signal 94, which is followed by a time shifted transfer gate signal for the red sensor RED TG signal 96.

FIGS. 11A and 11B further show how, preferably, all three transfer gate signals are related through phase shifts with respect to time. It will be readily understood by one skilled in the art that where the BLUE TG signal 92 is some periodic timing signal as a function of time BLUE TG($\omega$t), the blue, green and red transfer gate signals are generally related as follows:

BLUE TG($\omega$t)=BLUE TG($\omega$t)

GREEN TG($\omega$t)=BLUE TG($\omega$(t–$\tau$))

RED TG($\omega$t)=BLUE TG($\omega$(t–$\sigma$))

where $0<\tau$, $\sigma<T$ and $\omega$ is the angular frequency and $\tau$ and $\sigma$ are phase shifts for each signal. The periodicity T of the transfer gate signals is equivalent to the linetime which is shown in FIGS. 11A and 11B as the distance between the leading edges of the timing pulses.

FIG. 11B shows how when the CCD 40 has uniform optical line spacings, i.e., equal optical line spacing between photosensors, $\sigma$ is equal to $2\tau$. For the periodic transfer gate signals, a shift in the time scale of $2\tau=(nT+\sigma)$ where n is an integer and $0<\sigma<T$, is equivalent to a shift of $\sigma$. Therefore, TG[$\omega$(t+nT+$\sigma$)] is equivalent to a shift of TG[$\omega$(t+$\sigma$)] where $\sigma=2\tau$ for $0<2\tau<T$, or $\sigma=2\tau-T$ for $T<2\tau<2T$.

With reference to the specific example, the following transfer gate signals would correct the fractional misregistration at 1,600 dpi:

GREEN TG($\omega$t)=BLUE TG($\omega$(t–0.8T))

RED TG($\omega$t)=GREEN TG($\omega$(t–0.8T))=BLUE TG($\omega$(t–0.6T))

Qualitatively, $\tau$ is the amount of delay present in the GREEN TG signal so as to register the green and blue color pixels. In general, $\tau$ is equal to the fractional lineskip times the period T of the transfer gate signal.

$\tau$=FRACTIONAL LINESKIP(G:B)$\times$T=(1–$\delta_{GB}$) T $\tau$=FRAC[OLS(G:B)/SP]$\times$T $\tau$=FRAC(4.8)$\times$T $\tau$=0.8T On account of the uniform optical line spacing between photosensors, the amount of delay present in the RED TG signal necessary to register the red and blue pixels is $2\tau$ or 1.6T. This is equivalent to $\sigma$=0.6T. The RED TG delay may be computed using the Fractional Lineskip as follows:

$\sigma$=FRACTIONAL LINESKIP(R:B)$\times$T=(1–$\delta_{GB}$) T $\sigma$=FRAC[OLS(R:B)/SP] $\times$T $\sigma$=FRAC(9.6)$\times$T $\sigma$=0.6T FIGS. 12A and 12B compare an imaging system of the prior art with the imaging system and method of the present invention. FIG. 12A shows how a prior art sensing system essentially comprising a trilinear photosensor array 40A has a common transfer gate receiving means BGR. For purposes of illustration, only the pin-out for the transfer gate receiving means BGR is shown on the trilinear photosensor array 40B. A common transfer gate signal TG(t) triggers all three photosensor arrays to scan simultaneously so that the shifted blue 80, green 70, and red 60 integrated scenes combine into a misregistered electronic image as shown.

FIG. 12B shows how a sensing system of the present invention essentially comprises a trilinear photosensor array 40B having three independent transfer gate receiving means B, G and R for receiving a blue, green and red transfer gate signal, respectively. Only the pin-outs for the independent transfer gate receiving means B, G and R are shown on the trilinear photosensor array 40B. Three time shifted transfer gate signals TG($\omega$(t–$\sigma$)), TG($\omega$(t–$\tau$)) and TG($\omega$t) trigger each blue 46, green 44 and red 42 photosensor array to scan at shifted points in time, so that, the blue 80, green 70, and red 60 integrated scenes combine into a registered electronic image as shown.

It will be readily understood that the teachings of the present invention apply to other multisensor arrays as further described herein. Thus it will be appreciated that FIG. 12B is not intended to be limiting with respect to the number of photosensor arrays employed in the sensing system of the present invention.

Alternatively, the transfer gate signals may be advanced with respect to time. It would be readily understood by one skilled in the art that for time shifted periodic signals such as transfer gate signals, a delay of $\tau$ where $0<\tau<T$ is equivalent to an advance of T–$\tau$: TG($\omega$(t–$\tau$))=TG($\omega$)t+$\tau$–T)).

Qualitatively, T–$\tau$ is the amount of advance which is present in the GREEN TG signal so as to register the green and blue color pixels, and similarly, 2$\times$(T–$\tau$) is the amount of advance present in the RED TG signal required to register the red and blue pixels. In general, T–$\tau$ is equal to the 1-fractional lineskip times the period T of the transfer gate signal. Since 1–Fractional Lineskip equals $\delta$, T–$\tau$=$\delta$T.

It will be readily understood by one skilled in the art that where the BLUE TG signal 92 is some periodic timing signal as a function of time, BLUE TG($\omega$t), the blue, green and red transfer gate signals are generally related as follows:

GREEN TG($\omega t$)=BLUE TG($\omega$($t$+0.2T))

RED TG($\omega t$)=GREEN TG($\omega$($t$+0.2T))=BLUE TG($\omega$($t$+0.4T))

It is convenient to use units of optical pixel lengths and resolution parameters for the computation of the lineskip. The lineskip may be computed as the quotient of the optical line spacing and the scanned pixel size in units of optical pixel lengths.

$$\text{LINESKIP} = \frac{\text{Optical Line Spacing [Optical pixel lengths]}}{\text{Size of the Scanned Pixel [Opt. Pixel lengths]}}$$

And where the linetime for a scan at any resolution is substantially constant, the size of the scanned pixel in terms of optical pixel lengths can be computed as follows:

$$\frac{\text{Scanned pixel size}}{\text{Optical pixel size}} = \frac{\text{Scan Velocity}}{\text{Optical Scan Velocity}}$$

$$\text{Scanned Pixel Size [Opt. pixel lengths]} = \frac{\text{Optical Resolution}}{\text{Scanning Resolution}}$$

Thus, the lineskip may be calculated in terms of the optical line spacing, optical and scanning resolutions as shown.

$$\text{LINESKIP} = \text{Optical Line Spacing} \times \frac{\text{Scanning Resolution}}{\text{Optical Resolution}}$$

Returning to the color misregistration problem at a 1,600 dpi scan utilizing a trilinear CCD as described above, using the above formula the amount of lineskip required to register the green pixel data with the blue pixel data is computed as follows:

LINESKIP(G:B)=12×(1,600/4,000)=12×(4/10)=4.8.

where the OLS between green 44 and blue 46 CCD sensors is 12 optical pixel lengths. Thus, the GREEN TG signal is a time delayed version of the BLUE TG signal by an amount τ=0.80T.

The amount of lineskip required to register the red pixel data with the blue pixel data is computed as follows:

LINESKIP(R:B)=24×(1,600/4,000)=9.6.

where the OLS between red 42 and blue 46 CCD sensors is 24 optical pixel lengths. Hence, the RED TG signal is a time delayed version of the BLUE TG signal by an amount σ0.60T.

Table 1 has a plurality of resolutions where the lineskips have been calculated according to the above formulas. The lineskip is broken into two columns for each pair of color sensors. The column designated INTEGER is the integer component of the lineskip, whereas, the column designated FRACTIONAL is the fractional component of the lineskip. The lineskip for a particular scan is equal to the sum of the two columns.

The time delays τ and σ for the green and red transfer gate signals may be readily computed by multiplying the decimal fraction in the fractional column by the period of the transfer gate signal T.

It is further noted that not in every case of a fractional lineskip is it required that both the green and red TG signals be shifted in time. At 500 dpi, for example, only the green TG signal need be shifted because of the fractional lineskip between the green and blue sensors only.

RED TG(ωt−τ), may register the currently scanned green pixel and green integrated scene with the actively scanned red pixel using independent transfer gate signals and a trilinear CCD 40 of the present invention. Thus, it will be appreciated that the teachings of the present invention allow for different combinations of time-shifted transfer gate signals to be applied in which the triggering of leading photosensors are delayed or advanced.

The teachings of the present invention may be readily applied to CCDs having a plurality of photosensor arrays. In general, the time delay necessary to register the integrated scenes produced by a leading photosensor K and a lagging photosensor K+1 is defined as follows:

$$\tau_{K+1} = T \times \text{Fractional}[OLS(K+1:K)/SP]$$

If TG(ωt) is the transfer gate signal for a leading photosensor array K then TG(ω)(t−$\tau_{K+1}$)) will register the integrated scene produced by the lagging photosensor K+1 with the integrated scene produced by the leading photosensor K. The transfer gate signals as a function of the fractional lineskip may be stated as follows:

$$TG_{K1}(\omega t) = TG(\omega(t - T \times FRAC[OLS(K1:K1)/SP]))$$

$$TG_{K2}(\omega(t+\tau_{K2})) = TG(\omega(t - T \times FRAC[OLS(K2:K1)/SP]))$$

where it will be readily understood that the fractional lineskip between the same photosensor K1 equals zero (FRAC[OLS(K:K)/SP]=0). In general, the above may be applied to a CCD having N independent receiving means and N photosensors with the following transfer gate signals:

TABLE 1

(4,000 dpi optical resolution, Optical Line Spacing = 12)
(R:G spacing = G:B spacing = 12); (R:B spacing = 24)

| Scanning Resolution [dpi] | Scanned Pixel Size [Opt. Pix. Lengths] | LINESKIP(G:B) Opt. Line Spacing (G:B) / Scanned Pixel Size | | LINESKIP(R:B) Opt. Line Spacing (R:B) / Scanned Pixel Size | |
|---|---|---|---|---|---|
| | | INTEGER | FRACTIONAL τ/T = (1 − $\delta_{G:B}$) | INTEGER | FRACTIONAL σ/T = (1 − $\delta_{R:B}$) |
| 4,000 | 1 | 12 | 0.00 | 24 | 0.00 |
| 3,800 | 1.053 | 11 | 0.40 | 22 | 0.80 |
| 3,750 | 1.067 | 11 | 0.25 | 22 | 0.50 |
| 3,700 | 1.081 | 11 | 0.10 | 22 | 0.20 |
| 3,600 | 1.111 | 10 | 0.80 | 21 | 0.60 |
| 3,125 | 1.28 | 9 | 0.375 | 18 | 0.75 |
| 3,000 | 4/3 | 9 | 0.00 | 18 | 0.00 |
| 2,540 | 1.574 | 7 | 0.62 | 15 | 0.24 |
| 2,000 | 2 | 6 | 0.00 | 12 | 0.00 |
| 1,600 | 2.5 | 4 | 0.80 | 9 | 0.60 |
| 1,333⅓ | 3⅓ | 4 | 0.00 | 8 | 0.00 |
| 1,200 | 3 | 3 | 0.60 | 7 | 0.20 |
| 1,000 | 4 | 3 | 0.00 | 6 | 0.00 |
| 950 | 4.211 | 2 | 0.85 | 5 | 0.70 |
| 800 | 5 | 2 | 0.40 | 4 | 0.80 |
| 500 | 8 | 1 | 0.50 | 3 | 0.00 |
| 333 | 12.012 | 0.999 | 0.001 | 1.998 | 0.002 |

FIG. 13 shows in general how the delay in red 92 and green 94 transfer gate signals GREEN TG(ωt)=BLUE TG(ω(t−τ)) and RED TG(ωt)=GREEN TG(ω)(t−τ))=BLUE TG(ω)(t−σ)) registers the currently scanned green and blue pixels and green and blue integrated scenes with the actively scanned red pixel using independent transfer gate signals and a trilinear CCD 40 of the present invention.

FIG. 14 shows in general how a delay in the lead photosensor array transfer gate signal, GREEN TG(ωt)=

$$TG_K(\omega t) = TG(\omega(t - T \times FRAC[OLS(K1:K1)/SP]))$$

$$TG_{K2}(\omega(t - \tau_{K2})) = TG(\omega(t - T \times FRAC[OLS(K2:K1)/SP]))$$

...

-continued $$TG_{KN}(\omega(t-\tau_{KN})) = TG(\omega(t - T \times FRAC[OLS(KN:K1)/SP])$$

where K=K1, K2, ... KN.

It will be further understood that the physically leading sensor in the scanning direction may be time shifted when an intermediate photosensor array is chosen as the lead sensor (K=1) for purposes of reference. For example, for a typical color trilinear CCD having three independent transfer gate receiving means with a leading blue photosensor array followed by green and red respectively, the blue and green, or blue and red photosensor arrays may be triggered with time shifted transfer gate signals. In the former case, the red photosensor array would be the reference photosensor (K=1) whereas in the latter case the green photosensor array would be the reference photosensor (K=1).

FIG. 15 shows how the teachings of the present invention allows CCD designs of differing optical line spacings. For example, it will be readily understood by one skilled in the art that the teachings of the present invention allow for optical line spacings which are not integer multiples of optical pixel lengths. It will be further appreciated that the optical line spacing between photosensor arrays does not have to be uniform.

FIG. 15A shows a CCD having both non-integer and nonuniform optical line spacings between leading and lagging photosensor arrays (Pin-outs not shown). For purposes of illustration, FIG. 15A shows a color CCD array having a green-blue optical line spacing OLS(G:B) and a red-green optical line spacing OLS(R:G) equal to 72.9 μm and 118 μm, respectively. Assuming an optical pixel length of 9 μm an imaging system employing a CCD with these characteristics will exhibit misregistration errors at optical resolution. At optical resolution, the misregistration errors are as follows:

$$\delta_{GB} = 1 - FRACTIONAL\ LINESKIP(G:B) = 1 - \frac{FRAC(OLS(G:B))}{OP}$$

$$= 1 - FRAC\left(\frac{118}{9}\right) = 1 - FRAC(13.111\cdots) = 0.8999\cdots$$

$$\delta_{RG} = 1 - FRACTIONAL\ LINESKIP(R:G) = 1 - \frac{FRAC(OLS(R:G))}{OP}$$

$$= 1 - FRAC\left(\frac{72.9}{9}\right) = 1 - FRAC(8.1) = 0.9$$

$$\delta_{RB} = 1 - FRACTIONAL\ LINESKIP(R:B) = 1 - \frac{FRAC(OLS(R:B))}{OP}$$

$$= 1 - FRAC\left(\frac{190.9}{9}\right) = 1 - FRAC(21.2111\cdots) = 0.7999\cdots$$

FIG. 15B shows the integrated scenes for common transfer gate signals. Since $\delta_{GB}$ and $\delta_{RB}$ are repeating decimals, the misregistration errors may be minimized with the following transfer gate signals:

GREEN TG(ωt)=BLUE TG(ωt−0.89T)
RED TG(ωt)=BLUE TG(ωt−0.79T) or,
GREEN TG(ωt)=BLUE TG(ωt+0.11T)
RED TG(ωt)=BLUE TG(ωt+0.21T)

FIG. 16A shows how, for example, the teachings of the present invention may be readily applied to monochromatic imaging systems which utilize piece-wise linear CCD arrays. The CCD 140 comprises three piece-wise linear photosensor segments 142, 144 and 146 respectively (Pin-outs not shown). In this example, segments 142 and 146 align in the x-direction while the lead sensor segment 144 extends in the direction of the scan. The optical line spacing is the distance between segments 142 and 144 or equivalently 146 and 144. The lineskip between either lagging photosensor 142 or 146 and leading photosensor 144 equals the optical line spacing S divided by the scanned pixel size.

$$LINESKIP = \frac{OPTICAL\ LINE\ SPACING}{SCANNED\ PIXEL\ SIZE}$$

$$= \frac{S}{SCANNED\ PIXEL\ SIZE}$$

The fractional lineskip is the fractional component of the lineskip.

$$FRACTIONAL\ LINESKIP = FRAC\frac{S}{SCANNED\ PIXEL\ SIZE}$$

$$= 1 - \delta_S$$

FIG. 16B shows qualitatively, for a resolution in which the lineskip has a fractional component that is not corrected for in accordance with the teachings of the present invention, the scanned pixels for segments 142 and 146 will be shifted with respect to the pixels scanned by the middle segment 144. The amount of shift or misregistration is shown qualitatively as $\delta_S$, To register the monochromatic scenes 142D, 144D and 146D, transfer gate signals for the upper and lower segments 142 and 146 may be advanced by $\tau = \delta_S T$ or delayed by $T - \tau = (1 - \delta_S) \times T$ where $1 - \delta_S$ is the fractional component of the lineskip between sensor segments.

FIG. 17 shows a color CCD 340 comprising three color segmented arrays R, G and B where each segmented array is in a similar piecewise linear configuration as above (Pin-outs not shown). The red photosensor segment R consists of red photosensor arrays $R_1$, $R_2$, $R_3$, the green photosensor segment G consists of green photosensor arrays $G_1$, $G_2$, $G_3$, and the blue photosensor segment B consists of blue photosensor arrays $B_1$, $B_2$, $B_3$. For purposes of illustration, it is assumed that within any R, G or B segment the photosensor arrays indexed with 1 and 3 align in the same x-dimension. Thus $R_1$ aligns with $R_3$, $G_1$ aligns with $G_3$ and $B_1$ aligns with $B_3$. It is further assumed for purposes of illustration that the optical line spacing between any pair of adjacent photosensors in the y-dimension is uniform. Therefore, for example, the optical line spacing between $R_1$ and $G_1$ OLS($R_1:G_1$) is equal to the optical line spacing between $G_1$ and $B_1$ OLS($G_1:B_1$) and in general, OLS($R_i:G_i$) equals OLS($G_i:B_i$).

If $B_1$, the lead photosensor, is chosen for purposes of reference as the sensor which receives the first transfer gate signal $TG_{B1}(t) = TG(\omega t)$ then in general the remaining delayed transfer gate signals will be of the form:

$$TG_K = TG(\omega(t - \tau_K))$$

where the delay $\tau K = \frac{FRAC(OLS(K:B_1)) \times T}{SP}$ for $K = \{B_1, B_2, B_3, G_1, G_2, G_3, R_1, R_2, R_3\}$ Table 2 shows, for an imaging system having an optical resolution of 4,000 dpi, an optical line spacing between color sensors of the same index equal to 12 optical pixel lengths and an optical line spacing between offset photosensors ($B_1$ and $B_2$, and $B_2$ and $B_3$) equal to 3 optical pixel lengths, that for a scan at 1,600 dpi the following set of transfer gate signals will correct the misregistration error.

TABLE 2

(4,000 dpi optical resolution, Scanning resolution = 1,600 dpi)
(Uniform Optical Line Spacing = 12 Optical Pixel Lengths, Offset Optical Spacing = 3 Optical Pixel Lengths)

| SENSOR (K) | $\tau = \text{FRAC}\dfrac{\text{OLS}(K:B1)}{SP} \times T$ | | TG($\omega t - \tau$) |
|---|---|---|---|
| $B_1$ | $\tau = \text{FRAC}\dfrac{\text{OLS}(B_1:B_1)}{SP} \times T$ | FRAC(0/2.5) × T | TG($\omega t$) |
| $B_2$ | $\tau = \text{FRAC}\dfrac{\text{OLS}(B_2:B_1)}{SP} \times T$ | FRAC(3/2.5) × T | TG($\omega t - 0.2T$) |
| $B_3$ | $\tau = \text{FRAC}\dfrac{\text{OLS}(B_3:B_1)}{SP} \times T$ | FRAC(3/2.5) × T | TG($\omega t - 0.2T$) |
| $G_1$ | $\tau = \text{FRAC}\dfrac{\text{OLS}(G_1:B_1)}{SP} \times T$ | FRAC(12/2.5) × T | TG(($\omega t - 0.8T$)) |
| $G_2$ | $\tau = \text{FRAC}\dfrac{\text{OLS}(G_2:B_1)}{SP} \times T$ | FRAC(15/2.5) × T | TG($\omega t$) |
| $G_3$ | $\tau = \text{FRAC}\dfrac{\text{OLS}(G_3:B_1)}{SP} \times T$ | FRAC(15/2.5) × T | TG($\omega t$) |
| $R_1$ | $\tau = \text{FRAC}\dfrac{\text{OLS}(R_1:B_1)}{SP} \times T$ | FRAC(24/2.5) × T | TG(($\omega t - 0.6T$)) |
| $R_2$ | $\tau = \text{FRAC}\dfrac{\text{OLS}(R_2:B_1)}{SP} \times T$ | FRAC(27/2.5) × T | TG($\omega t - 0.8T$) |
| $R_3$ | $\tau = \text{FRAC}\dfrac{\text{OLS}(R_3:B_1)}{SP} \times T$ | FRAC(27/2.5) × T | TG($\omega t - 0.8T$) |

FIG. 18 shows how the present invention can be applied to color misregistration errors caused by automatic exposure controls. As known in the art, blue, green and red sensors have different sensitivities to light. For example, blue sensors are less sensitive to light than green or red sensors. Typically, this requires that the blue sensor has a longer exposure period for integrating light during a linetime than the exposure periods for the green or red sensors.

FIG. 18 shows how an automatic exposure control causes the center of a blue pixel 250 to be shifted with respect to the corresponding center of a green 252 or red 254 pixel. Assuming an optical scan, the beginning and ending of the linetimes for each color pixel are shown with respect to the original 10 as $t_i$ and $t_{i+1}$, respectively. R, G, B represent the scanned pixel size when there is no adjustment in the exposure and thus the exposure period equals the linetime. The pixel sizes in relation to their respective exposure periods are represented by segments $R_E$, $G_E$, $B_E$, respectively. The differences in exposure times causes a misregistration problem by shifting the center of each color pixel as indicated by the positions of 250, 252, and 254 respectively. Thus, even when the optical line spacing divided by the scanned pixel size is an integer, e.g., during an optical scan, integrated a scenes or the domains for the blue, green and red pixel data are shifted due to the differences in exposure times for each color sensor.

The misregistration caused by the nonuniform exposure periods for each color may be solved by the present invention's teachings of time-shifting transfer gate signals. In FIG. 17, where it is assumed that the exposure time for the blue sensor equals the linetime, there is only the need to time-shift the green and red transfer gate signals.

The teachings of the present invention correct for variable exposure settings by time shifting the appropriate transfer gate signals a fraction of the linetime corresponding to the duration of nonexposure divided by two, thereby aligning the center gravity for each color pixel. As known in the art of digital sampling, the duration of nonexposure corresponds to a segment of nonexposure $\delta_{NE}$ within the scanned pixel where light is not exposed to the corresponding sensor as indicated by $\delta_{GNE}$ and $\delta_{RNE}$, for the green and red pixels, respectively. One way to correct for the shift in pixel center gravity due to variable exposure times is to advance each color signal by amount of time which corresponds to the nonexposure period divided by two, ($\delta_{GNE}/2$), ($\delta_{RNE}/2$). One way this can be accomplished is with the following transfer gate signals:

Blue Transfer Gate=TG($\omega t$);

Green Transfer Gate=TG($\omega$)(t$-$T $\delta_{GNE}/2$)); and,

Red Transfer Gate=TG($\omega$(t$-$T $\delta_{RNE}/2$)).

As disclosed above, many obvious modifications and variations are possible in light of the above teaching. For example, as has been described, a time shift may consist of a delay or an equivalent advance in the transfer gate signals. Further, a leading photosensor array may be shifted with respect to time as opposed to a lagging photosensor array by selecting a lagging photosensor as the reference sensor.

The teachings of the present invention allow for CCDs to be employed with optical line spacings that are neither uniform nor an integer number of pixels in length. In fact the present invention allows for CCDs to be used which have a combination of nonuniform and non-integer optical line spacings.

It will be readily understood by one skilled in the art that the correction for the misregistration error caused by a fractional lineskip at a particular resolution may not be perfect since the fractional component of the optical line spacing divided by the scanned pixel size may be a long decimal equivalent with a number of insignificant digits which exceeds the accuracy of the imaging system. Such examples include, but are not limited to, fractional lineskips that have long repeating decimals and irrational numbers; in which event, small round off errors may exist in the registration.

For purposes of illustration, resolution scans taken at a lower than optical resolution have been described. It will be readily understood by one skilled in the art that the present invention has application to scanning or photo imaging systems where the resolution is greater than the optical resolution (oversampling).

Thus, it will be appreciated that the foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to a person skilled in the art are intended to be included within the scope of this invention as defined by the accompanying claims.

We claim:

1. An imaging system for registering electrical images at a plurality of selectable resolutions, comprising:

an optical system; and, a sensing system further comprising a number of photosensor arrays wherein said number is an integer N greater than or equal to 2, said photosensor arrays having optical line spacings OLS(K+1:K) in reference to a leading photosensor array K and with respect to a lagging photosensor array K+1, for K equal to an integer from 1 to N−1, each of said number of N photosensor arrays further including a corresponding number of N transfer gate receiving means, so that, each of said N photosensor arrays is capable of being independently triggered to convert optical signals into electrical signals in response to a corresponding one of a plurality of transfer gate signals, $TG_i(t)$, for i equal to an integer from 1 to N, wherein each one of said transfer gate signals has a periodicity T and angular frequency $\omega$, said transfer gate signals being of the general form $TG_i(t)=TG_i(\omega(t-\tau_i))$.

2. The system of claim 1 wherein each of said plurality of photosensor arrays comprises a color filter stripe for color spectral separation.

3. The system of claim 2 said number of N photosensor arrays comprises three photosensor arrays, a blue photosensor array, a green photosensor array and a red photosensor array for blue, green and red color spectral separation, respectively, said blue, green and red photosensor arrays further including a blue, green and red transfer gate receiving means, respectively.

4. The system of claim 3 wherein said green photosensor array and said blue photosensor have a green-blue optical line spacing referenced by OLS(G:B), said red photosensor array and said blue photosensor have a red-blue optical line spacing herein referenced by OLS(R:B), and, said red photosensor array and said green photosensor have a red-green optical line spacing herein referenced by OLS(R:G).

5. The system of claim 4 wherein said green photosensor array and said blue photosensor array have a green-blue lineskip referenced by LINESKIP(G:B), said red photosensor array and said blue photosensor array have a red-blue lineskip referenced by LINESKIP(R:B), and said red photosensor array and said green photosensor array have a red-green lineskip referenced by LINESKIP(R:G), at said selected resolution, and are defined as follows:

$$LINESKIP(G{:}B) = OLS(G{:}B) \times \frac{\text{Scanning Resolution}}{\text{Optical Resolution}}$$

$$LINESKIP(R{:}B) = OLS(R{:}B) \times \frac{\text{Scanning Resolution}}{\text{Optical Resolution}}$$

$$LINESKIP(R{:}G) = OLS(R{:}G) \times \frac{\text{Scanning Resolution}}{\text{Optical Resolution}}.$$

6. The system of claim 5 wherein said green photosensor array and said blue photosensor have a green-blue fractional lineskip referenced by FRACTIONAL LINESKIP(G:B), said red photosensor array and said blue photosensor array have a red-blue fractional lineskip referenced by FRACTIONAL LINESKIP(R:B), and, said red photosensor array and said green photosensor array have a red-green fractional lineskip referenced by FRACTIONAL LINESKIP(R:G), at said selected resolution, and defined as follows:

$$FRACTIONAL\ LINESKIP(G{:}B) = FRACTIONAL\left(OLS(G{:}B) \times \frac{\text{Scanning Resolution}}{\text{Optical Resolution}}\right)$$

$$FRACTIONAL\ LINESKIP(R{:}B) = FRACTIONAL\left(OLS(R{:}B) \times \frac{\text{Scanning Resolution}}{\text{Optical Resolution}}\right)$$

$$FRACTIONAL\ LINESKIP(R{:}G) = FRACTIONAL\left(OLS(R{:}G) \times \frac{\text{Scanning Resolution}}{\text{Optical Resolution}}\right).$$

7. The system of claim 6 wherein said plurality of transfer gate signals $TG_i(t)=TG_i(\omega(t-\tau_i))$ for i equal to an integer from 1 to 3, comprises a blue transfer gate signal $TG_B(\omega t)$ corresponding to said blue transfer gate receiving means for said blue photosensor array, a green transfer gate signal $TG_G(\omega t)$ corresponding to said green transfer gate receiving means for said green photosensor array, and a red transfer gate signal $TG_R(\omega t)$ corresponding to said red transfer gate receiving means for said red photosensor array, said blue, green and red transfer gate signals being generally defined as follows:

$TG_1(t)=TG_B(\omega t)$ $TG_2(t)=TG_G(\omega(t-\tau))$ $TG_3(t)=TG_R(\omega(t-\sigma))$.

8. The system of claim 7 wherein said green transfer gate signal further comprises a time shifted transfer gate signal, said time-shifted green transfer gate signal being delayed by an amount $\tau$, wherein said time delay $\tau$ equals the product of said green-blue fractional lineskip and the periodicity, T, of said transfer gate signals as follows:

$\tau$=FRACTIONAL LINESKIP(G:B)×T, such that, said green transfer gate signal is of the form: $TG_G(t)=TG_B(\omega(t-\tau))$.

9. The system of claim 7 wherein said red transfer gate signal further comprises a time shifted transfer gate signal, said time shifted red transfer gate signal being delayed by an amount $\sigma$, wherein said time delay $\sigma$ equals the product of said red-blue fractional lineskip and the periodicity, T, of said transfer gate signals as follows:

$\sigma$=FRACTIONAL LINESKIP(R:B)×T, such that, said red transfer gate signal is of the form: $TG_R(t)=TG_B(\omega(t-\sigma))$.

10. The system of claim 7 wherein said green transfer gate signal further comprises a time shifted transfer gate signal, said time-shifted green transfer gate signal being advanced by an amount T−$\tau$, wherein said time advance is defined as follows, T−$\tau$=(1−FRACTIONAL LINESKIP(G:B))×T, and, wherein said green transfer gate signal is of the form:

$TG_G(t)=TG_B(\omega)(t+T-\tau))$.

11. The system of claim 7 wherein said red transfer gate signal further comprises a time shifted transfer gate signal, said time shifted red transfer gate signal being advanced by an amount T−$\sigma$, wherein said time advance T−$\sigma$ is defined as follows, T−$\sigma$=(1−FRACTIONAL LINESKIP(R:B))×T, and, wherein said red transfer gate signal is of the form:

$TG_R(t)=TG_B(\omega(t+T-\sigma))$.

12. The system of claim 6 wherein said plurality of transfer gate signals comprises a blue transfer gate signal $TG_B(\omega(t-\tau))$ corresponding to said blue transfer gate receiving means for said blue photosensor array, a green transfer gate signal $TG_G(\omega t)$ corresponding to said green transfer gate receiving means for said green photosensor array, and a red transfer gate signal $TG_R(\omega(t-\phi))$ corresponding to said red transfer gate receiving means for said red photosensor array, said blue, green and red transfer gate signals being generally defined as follows:

$TG_B(\omega(t-\tau))=TG_B(\omega(t-\text{FRACTIONAL LINESKIP}(B:G)\times T)$ $TG_G(\omega t)=TG_G(\omega t)$ $TG_R(\omega(t-\phi))=TG_R(\omega(t-\text{FRACTIONAL LINESKIP}(R:G)\times T))$.

13. The system of claim 6 wherein said plurality of transfer gate signals comprises a blue transfer gate signal $TG_B(\omega(t-\tau))$ corresponding to said blue transfer gate receiving means for said blue photosensor array, a green transfer gate signal $TG_G(\omega(t-\sigma))$ corresponding to said green transfer gate receiving means for said green photosensor array, and a red transfer gate signal $TG_R(\omega t)$ corresponding to said red transfer gate receiving means for said red photosensor array, said blue, green and red transfer gate signals being generally defined as follows:

$TG_B(\omega(t-\tau))=TG_B(\omega(t-\text{FRACTIONAL LINESKIP}(B:R)\times T)$ $TG_G(\omega(t-\sigma))=TG_G(\omega t-\text{FRACTIONAL LINESKIP}(G:R)\times T)$ $TG_R(\omega t)=TG_R(\omega t)$.

14. The system of claim 1 wherein the lineskip at a selected resolution with respect to said leading photosensor array K with respect to said lagging photosensor array K+1 is comprised as follows:

$$\text{LINESKIP}(K+1:K) = OLS(K+1:K) \times \frac{\text{Scanning Resolution}}{\text{Optical Resolution}}$$

wherein said OLS is the Optical Line Spacing with respect to said leading color sensor array K and said lagging color sensor array K+1 in units of optical scan lines, and wherein said lineskip is in units of scan lines.

15. The system of claim 14 wherein the fractional lineskip at said selected resolution with respect to said leading photosensor array K and a lagging photosensor array K+1 comprises the fractional component of said lineskip, as follows:

FRACTIONAL LINESKIP(K+1:K)=FRACTIONAL (LINESKIP(K+1:K)).

16. The system of claim 15 wherein at least one of said corresponding number of N transfer gate signals $TG_i(\omega t)$ is shifted with respect to time, said time shift being of the form $\tau_i=\text{FRACTIONAL LINESKIP}(K+1:K)\times T$, where i=K+1.

17. The system of claim 15 wherein at least one of said corresponding number of N transfer gate signals $TG_i(\omega t)$ is shifted with respect to time said time shift being of the form $T-\tau_i=(1-\text{FRACTIONAL LINESKIP}(K+1:K))\times T$, where i=K+1.

18. The system of claim 1 wherein said sensor comprises a Charged Coupled Device, (CCD), having a plurality of photosensor arrays.

19. The system of claim 18 wherein the lineskip at a selected resolution with respect to said leading photosensor array K and a lagging photosensor array K+1 comprises:

$$\text{LINESKIP} = OLS(K+1:K) \times \frac{\text{Scanning Resolution}}{\text{Optical Resolution}}$$

wherein said OLS(K+1:K) is the Optical Line Spacing with respect to said leading color sensor array K and said lagging color sensor array K+1 in units of optical scan lines, and wherein said lineskip is in units of scan lines.

20. The system of claim 19 wherein the fractional lineskip at said selected resolution with respect to said leading photosensor array K and a lagging photosensor array K+1 comprises the fractional component of said lineskip, as follows:

FRACTIONAL LINESKIP(K+1:K)=FRACTIONAL- (LINESKIP(K+1:K)).

21. The system of claim 20 wherein at least one of said corresponding number of N transfer gate signals $TG_i(\omega t)$ is shifted with respect to time said time shift being of the form $\tau_i=\text{FRACTIONAL LINESKIP}(K+1:K)\times T$, where i=K+1.

22. The system of claim 20 wherein at least one of said corresponding number of N transfer gate signals $TG_i(\omega t)$ is shifted with respect to time said time shift being of the form $T-\tau_i=(1-\text{FRACTIONAL LINESKIP}(K+1:K))\times T$, where i=K+1.

23. A method for registering fractionally shifted blue, green and red integrated scenes for an imaging system, said imaging system comprising an optical system and a sensing system, said sensing system including a trilinear CCD having blue, green and red photosensor arrays for blue, green and red spectral separation, respectively, said CCD further having an optical line spacing between said red and green photosensor arrays OLS(R:G), an optical line spacing between said green and blue photosensor arrays OLS(G:B) and an optical line spacing between said red and blue photosensor arrays OLS(R:B), wherein each of said blue, green and red color photosensor arrays further includes a corresponding transfer gate receiving means, so that, each of said blue, green and red photosensor arrays is capable of being independently triggered to convert optical signals into electrical signals in response to a corresponding blue, green and red transfer gate signal, $TG_B(t)$, $TG_G(t)$, $TG_R(t)$, respectively, and wherein each one of said transfer gate signals has a periodicity, T, and angular frequency $\omega$, said transfer gate signals being of the general form $TG(t)=TG(\omega(t-\tau))$, said method comprising the steps of:

a) selecting a resolution for a scan;

b) calculating a green-blue lineskip, LINESKIP(G:B), between said green photosensor array and said blue photosensor array at said selected resolution as follows:

$$\text{LINESKIP}(G:B) = OLS(G:B) \times \frac{\text{Scanning Resolution}}{\text{Optical Resolution}}$$

c) calculating the green-blue fractional lineskip, FRACTIONAL LINESKIP(G:B), for said resolution by taking the fractional component of said green-blue lineskip according to the following:

FRACTIONAL LINESKIP(G:B) =

-continued $$\text{FRACTIONAL}\left(OLS(G:B) \times \frac{\text{Scanning Resolution}}{\text{Optical Resolution}}\right)$$

d) calculating a red-blue lineskip, LINESKIP(R:B), between said red photosensor array and said blue photosensor array at said selected resolution as follows:

$$\text{LINESKIP}(R:B) = OLS(R:B) \times \frac{\text{Scanning Resolution}}{\text{Optical Resolution}}$$

e) calculating the red-blue fractional lineskip, FRACTIONAL LINESKIP(R:B), for said resolution by taking the fractional component of said red-blue lineskip according to the following:

FRACTIONAL LINESKIP(R:B) =

$$\text{FRACTIONAL}\left(OLS(R:B) \times \frac{\text{Scanning Resolution}}{\text{Optical Resolution}}\right)$$

f) calculating a time shift comprising a time delay, τ, wherein said time delay τ equals the product of said green-blue fractional lineskip and the periodicity, T, of said transfer gate signals as follows:

τ=FRACTIONAL LINESKIP(G:B)×T;

g) calculating a time shift comprising a time delay, σ, wherein said time delay σ equals the product of said red-blue fractional lineskip and the periodicity, T, of said transfer gate signals as follows:

σ=FRACTIONAL LINESKIP(R:B)×T;

h) providing a blue transfer gate signal to said receiving means of said blue photosensor array, said blue transfer gate signal being of the form:

$TG_B(t)=TG_B(\omega t)$;

i) providing a time shifted transfer gate signal to said receiving means for said green photosensor array, said green transfer gate signal being delayed by an amount τ, such that, said green transfer gate signal is of the form:

$TG_G(t)=TG_B(\omega(t-\tau))$;

j) providing a time shifted transfer gate signal to said receiving means for said red photosensor array, said red transfer gate signal being delayed by an amount τ with respect to said blue transfer gate signal, such that, said red transfer gate signal is of the form:

$TG_R(t)=TG_B(\omega(t-\sigma))$;

k) triggering said blue, green and red photosensor arrays with said blue, green and red transfer gate signals, respectively.

24. The method of claim 23 wherein said time shifts are time advances T–τ and T–σ said time advances being further defined as follows:

T–τ=1–(FRACTIONAL LINESKIP(G:B)×T), and,

T–σ=(1–FRACTIONAL LINESKIP(R:B))×T, such that, said transfer gate signals are of the form:

$TG_B(t)=TG_B(\omega t)$;

$TG_G(t)=TG_B(\omega(t+T-\tau))$;

$TG_R(t)=TG_B(\omega(t+T-\sigma))$.

25. The method of claim 23 wherein step (b) calculating said green-blue lineskip at said selected resolution is computed as follows:

$$\text{LINESKIP}(G:B) = \frac{OLS(G:B)}{\text{Size of the Scanned Pixel}}$$

wherein said Scanned Pixel Size and said Optical Line Spacing are in units of distance, and wherein said lineskip is in units of scan lines.

26. The method of claim 23 wherein step (d) calculating said red-blue lineskip at said selected resolution is computed as follows:

$$\text{LINESKIP}(R:B) = OLS(R:B) \times \frac{\text{Scanning Resolution}}{\text{Size of the Scanned Pixel}}$$

wherein said Scanned Pixel Size and said Optical Line Spacing are in units of distance, and wherein said lineskip is in units of scan lines.

27. The method of claim 23 further including the step of calculating the red-green lineskip, LINESKIP(R:G), between said red photosensor array and said green photosensor array at said selected resolution is computed as follows:

$$\text{LINESKIP}(R:G) = OLS(R:G) \times \frac{\text{Scanning Resolution}}{\text{Optical Resolution}}.$$

28. The method of claim 23 wherein said time shifts are time advances T–τ and T–σ said time advances being further defined as follows:

T–τ=1–(FRACTIONAL LINESKIP(B:G)×T), and,

T–σ=(1–FRACTIONAL LINESKIP(R:G))×T, such that, said transfer gate signals are of the form:

$TG_B(t)=TG_G(\omega(t+T-\tau,))$;

$TG_G(t)=TG_G(\omega t)$;

$TG_R(t)=TG_G(\omega(t+T-\sigma))$.

29. The method of claim 23 wherein said time shifts are time advances T–τ and T–σ said time advances being further defined as follows:

T–τ=1–(FRACTIONAL LINESKIP(B:R)×T), and

T–σ=(1–FRACTIONAL LINESKIP(G:R))×T, such that said transfer gate signals are of the form:

$TG_B(t)=TG_R(\omega(t+T-\tau))$;

$TG_G(t)=TG_R(\omega(t+T-\sigma))$;

$TG_R(t)=TG_R(\omega t)$.

30. The method of claim 23 wherein said time shifts are time delays, τ and σ, said time delays being further defined as follows:

τ=FRACTIONAL LINESKIP(B:G)×T and,

σ=FRACTIONAL LINESKIP(R:G)×T, such that said transfer gate signals are of the form:

$TG_B(t)=TG_G(\omega(t+T-\tau))$;

$TG_G(t)=TG_G(\omega t)$;

$TG_R(t)=TG_G(\omega(t+T-\sigma))$.

31. The method of claim 23 wherein said time shifts are time delays τ and σ, said time delays being further defined as follows:

τ=FRACTIONAL LINESKIP(B:R)×T and,

σ=1−FRACTIONAL LINESKIP(G:R)×T, such that said transfer gate signals are of the form:

$TG_B(t)=TG_R(\omega(t+T-\tau))$;

$TG_G(t)=TG_R(\omega(t+T-\sigma))$;

$TG_R(t)=TG_R(\omega t)$.

32. A method for registering a plurality of fractionally shifted integrated scenes for an imaging system comprising an optical system and a sensing system, said sensing system including an integer number of photosensor arrays wherein said integer is a number N greater than or equal to 2, said photosensor arrays having optical line spacings OLS(K+1:K) in reference to a leading photosensor array K and with respect to a lagging photosensor array K+1, for K equal to an integer from 1 to N−1, and wherein each of said plurality of N photosensor arrays further includes corresponding N transfer gate receiving means, so that, each of said N photosensor arrays is capable of being independently triggered to convert optical signals into electrical signals in response to a corresponding one of a plurality of transfer gate signals, $TG_i(t)$, where i is an integer from 1 to N, and wherein each one of said transfer gate signals has a periodicity T and angular frequency ω, said transfer gate signals being of the general form $TG_i(t)=TG_i(\omega(t-\tau_i))$, said method comprising the steps of:

a) selecting a resolution for a scan;
b) calculating the Lineskip, LINESKIP (K+1:K), between a leading photosensor array K and a lagging photosenor array K+1, at said selected resolution as follows:

$$LINESKIP(K+1:K) = OLS(K+1:K) \times \frac{Scanning\,Resolution}{Optical\,Resolution}$$

wherein said Optical Line Spacing, OLS(K+1:K), is the interchannel spacing between said leading photosensor sensor array K and said lagging photosensor array K+1 in units of optical scan lines, and wherein said lineskip is in units of scan lines;
c) calculating the Fractional Lineskip, FRACTIONAL LINESKIP(K+1:K), for said resolution by taking the fractional component of said Lineskip according to the following:

$$FRACTIONAL\,LINESKIP(K+1:K) = FRACTIONAL\left(OLS(K+1:K) \times \frac{Scanning\,Resolution}{Optical\,Resolution}\right)$$

d) calculating a time shift comprising a time delay, $\tau_i$, wherein said time delay $\tau_i$ equals the product of the fractional lineskip and the periodicity T of said transfer gate signals as follows:

$\tau_i$=FRACTIONAL LINESKIP(K+1:K)×T where i=K+1;
e) providing a time shifted transfer gate signal to said receiving means of said lagging photosensor sensor, said transfer gate signal being delayed by an amount τ, such that said transfer gate signal is of the form:

$TG_i(t)=TG(\omega(t-\tau_i))$ where i=K+1;
f) triggering said lagging photosensor array K+1 with said time shifted transfer gate signal.

33. The method of claim 32 further including the steps of providing N transfer gate signals, wherein N is an integer greater than or equal to 2, said transfer gate signals being of the form:

$TG_1(t) = TG_1(\omega t)$ $TG_2(t) = TG_2(\omega(t-\tau_2))$;

$TG_3(t) = TG_3(\omega(t-\tau_3))$;

$\vdots$ $TG_N(t) = TG_K(\omega(t-\tau_i))$;

and wherein $\tau_i$ is equal to the product of T and the Fractional lineskip for a leading photosensor K and a lagging photosensor K+1, defined as follows:

$\tau_i$=T×FRACTIONAL LINESKIP(K+1:K), where i=K+1 for i=1, 2, ... N.

34. The method of claim 32 wherein said time shift in step (d) is an advance, T−τ, said time advance being further defined as follows: T−τ=(1−FRACTIONAL LINESKIP)×T, such that, said transfer gate signal is of the form:

$TG_{ADVANCE}(t)$=TG(ω(t+T−τ)).

35. The method of claim 34 further including the steps of providing N transfer gate signals, wherein i is an integer from 2 to N, and wherein said transfer gate signals are of the form:

$TG_1(t) = TG_1(\omega t)$ $TG_2(t) = TG_2(\omega(t+T-\tau_2))$;

$TG_3(t) = TG_3(\omega(t+T-\tau_3))$;

$\vdots$ $TG_N(t) = TG_K(\omega(t+T-\tau_i))$;

$T - \tau_i = T \times (1 - FRACTIONAL\,LINESKIP(K+1:K))$.

36. The method of claim 32 wherein step (b) calculating the Lineskip between a leading photosensor array and a lagging photosensor array at said selected resolution is computed as follows:

$$LINESKIP = \frac{Optical\ Line\ Spacing}{Size\ of\ the\ Scanned\ Pixel}$$

wherein said Scanned Pixel Size and said Optical Line Spacing are in units of distance, and wherein said lineskip is in units of scan lines.

37. The method of claim 32 wherein said sensing system comprises a CCD having N photosensor arrays.

* * * * *